(12) United States Patent
Aoki et al.

(10) Patent No.: US 9,261,007 B2
(45) Date of Patent: Feb. 16, 2016

(54) CATALYST-DEGRADATION DETECTION DEVICE

(75) Inventors: Keiichiro Aoki, Sunto-gun (JP); Go Hayashita, Susono (JP); Takanori Sasaki, Susono (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/350,685

(22) PCT Filed: Oct. 24, 2011

(86) PCT No.: PCT/JP2011/074439
§ 371 (c)(1),
(2), (4) Date: Apr. 9, 2014

(87) PCT Pub. No.: WO2013/061394
PCT Pub. Date: May 2, 2013

(65) Prior Publication Data
US 2014/0250993 A1    Sep. 11, 2014

(51) Int. Cl.
*F01N 11/00* (2006.01)
*F02D 41/14* (2006.01)
*F01N 3/10* (2006.01)

(52) U.S. Cl.
CPC .......... *F01N 11/007* (2013.01); *F02D 41/1441* (2013.01); *F02D 41/1456* (2013.01); *F01N 3/101* (2013.01); *F01N 2550/02* (2013.01); *F01N 2560/025* (2013.01); *F01N 2560/14* (2013.01); *F01N 2900/0416* (2013.01); *F01N 2900/1624* (2013.01); *Y02T 10/22* (2013.01); *Y02T 10/47* (2013.01)

(58) Field of Classification Search
CPC . F02D 41/1441; F02D 41/1456; F01N 3/101; F01N 11/007; F01N 2900/0416
USPC ............... 73/114.69, 114.71, 114.72, 114.73, 73/114.75
See application file for complete search history.

(56) References Cited

U.S. PATENT DOCUMENTS 5,970,707 A * 10/1999 Sawada .............. B01D 53/9454
                                                              123/691
8,763,365 B2 * 7/2014 Ishibashi ............... F01N 3/0842
                                                              60/276

(Continued)

FOREIGN PATENT DOCUMENTS

| JP | 06-159048 A | 6/1994 |
| JP | 11-093744 A | 4/1999 |

(Continued)

*Primary Examiner* — Laura Martin
*Assistant Examiner* — Suman K Nath
(74) *Attorney, Agent, or Firm* — Kenyon & Kenyon LLP

(57) ABSTRACT

An oxygen amount (an oxygen storage amount OSA) stored by metal cerium during a storage cycle is obtained based on an output value of an A/F sensor in a time period immediately before an exhaust air-fuel ratio (a downstream side A/F) detected by the A/F sensor shifts to a lean region, and degradation relating to OSC of the three-way catalyst is detected. In the storage cycle, a target air-fuel ratio is set so that an air-fuel ratio of exhaust emission flowing into an S/C changes from rich to lean. Therefore, the downstream side A/F shifts from stoichiometry to the lean region at a time after reaching stoichiometry. When the three-way catalyst degrades, the downstream side A/F shifts to the lean region from stoichiometry at a time. Therefore, the calculated oxygen storage amount OSA becomes extremely smaller as compared with that at a normal time.

15 Claims, 14 Drawing Sheets

(56) References Cited

U.S. PATENT DOCUMENTS

| | | |
|---|---|---|
| 2002/0148217 A1 | 10/2002 | Sawada |
| 2003/0017603 A1* | 1/2003 | Uchida .............. B01D 53/9495 436/37 |
| 2007/0017212 A1* | 1/2007 | Yamauchi ............. F01N 11/007 60/277 |
| 2009/0145109 A1* | 6/2009 | Kidokoro .............. F01N 3/0864 60/276 |
| 2010/0191444 A1* | 7/2010 | Aoki ..................... F01N 11/007 701/109 |
| 2012/0085084 A1* | 4/2012 | Bisaiji ................... F01N 11/007 60/276 |
| 2012/0191288 A1* | 7/2012 | Qi ......................... F01N 11/007 701/29.1 |

FOREIGN PATENT DOCUMENTS

| | | |
|---|---|---|
| JP | 2001-342824 A | 12/2001 |
| JP | 2003-097334 A | 4/2003 |
| JP | 2004-176611 A | 6/2004 |
| JP | 2006-063807 A | 3/2006 |
| JP | 2006-125226 A | 5/2006 |

* cited by examiner

CATALYST-DEGRADATION DETECTION DEVICE

CROSS-REFERENCE TO RELATED APPLICATIONS

This is a national phase application based on the PCT International Patent Application No. PCT/JP2011/074439 filed on Oct. 24, 2011, the entire contents of which are incorporated herein by reference.

TECHNICAL FIELD

The present invention relates to a catalyst-degradation detection device, and particularly relates to a catalyst-degradation detection device that detects degradation of a three-way catalyst having an exhaust emission purifying function.

BACKGROUND ART

There has been conventionally known a device that executes control of forcefully and periodically switching an exhaust air-fuel ratio at an upstream side from a three-way catalyst to a rich side and a lean side from stoichiometry (hereinafter, called "air-fuel ratio active control"), and detects degradation of the three-way catalyst. For example, Patent Literature 1 discloses the catalyst-degradation detection device that detects degradation of a three-way catalyst by using a stoichiometry holding time period of an exhaust air-fuel ratio that is detected by an air-fuel ratio sensor at a downstream side from the three-way catalyst during execution of air-fuel ratio active control.

The three-way catalyst has an ability to adsorb and store oxygen in exhaust emission when the exhaust air-fuel ration is lean, and to emit the oxygen that is adsorbed and stored when the exhaust air-fuel ratio is rich. Therefore, during execution of air-fuel ratio active control, the stoichiometry holding time period in which the exhaust air-fuel ratio at the downstream side from the three-way catalyst temporarily remains stoichiometric can be detected by the above described air-fuel ratio sensor. The stoichiometry holding time period has correlation with the amount of oxygen stored in or emitted from the three-way catalyst during this time period, and becomes short due to reduction in oxygen storage capacity (OSC) of the three-way catalyst. Accordingly, if the stoichiometry holding time period is used, degradation relating to the OSC of the three-way catalyst can be detected.

CITATION LIST

Patent Literature

Patent Literature 1: Japanese Patent Laid-Open No. 11-093744
Patent Literature 2: Japanese Patent Laid-Open No. 2003-097334
Patent Literature 3: Japanese Patent Laid-Open No. 2006-125226

SUMMARY OF INVENTION

Incidentally, in recent years, the need for the air-fuel systems that reduce the use amount of the catalysts while ensuring controllability and robustness has been increasing. However, reduction of the use amount of the catalyst leads to decrease in the oxygen adsorption/emission amount of the three-way catalyst, and therefore, there arises the problem that the stoichiometry holding time period that is detected in the above described Patent Literature 1 is reduced. Further, when degradation of the three-way catalyst does not advance so much, the oxidation-reduction capacity of the three-way catalyst is still high similarly to the OSC of the three-way catalyst. Therefore, if the air-fuel ratio active control is executed, and the exhaust air-fuel ratio at the upstream side of the three-way catalyst is changed from rich to lean, the problem as follows arises.

Namely, at the time of a low temperature, CO and $H_2O$ react with each other, and at the time of a high temperature, HC and $H_2O$ react with each other to generate $H_2$. By the $H_2$, a shift to rich by which the exhaust air-fuel ratio is shifted to a rich side is caused. If the shift to rich occurs, the stoichiometry holding time period that is detected is reduced correspondingly. Accordingly, when the use amount of the catalyst is reduced in the above described Patent Literature 1, there is the possibility of erroneously determining degradation. Therefore, in order to establish highly precise degradation determination technique corresponding to reduction in the use amount of the catalyst, further improvement has been needed.

The present invention is made in the light of the aforementioned problems. Namely, an object of the present invention is to provide a catalyst-degradation detection device capable of performing determination of degradation of a three-way catalyst with high precision even when a use amount of the catalyst is reduced.

Means for Solving the Problem

To achieve the above mentioned purpose, a first aspect of the present invention is a catalyst-degradation detection device, comprising:
a three-way catalyst that is disposed in an exhaust passage of an internal combustion engine to purify exhaust emission;
air-fuel ratio active control means that executes air-fuel ratio active control that forcefully and periodically switches a target air-fuel ratio at an upstream side from the three-way catalyst to a richer side and a leaner side than stoichiometry;
a downstream side air-fuel ratio sensor that detects an exhaust air-fuel ratio at a downstream side from the three-way catalyst; and
oxygen storage capacity degradation determining means that determines degradation relating to an oxygen storage capacity of the three-way catalyst by using the exhaust air-fuel ratio detected by the downstream side air-fuel ratio sensor during execution of the air-fuel ratio active control,
wherein the oxygen storage capacity degradation determining means determines degradation relating to the oxygen storage capacity of the three-way catalyst by using an oxygen storage amount that is calculated by using an exhaust air-fuel ratio detected by the downstream side air-fuel ratio sensor in a storage time period from a predetermined starting point in a rich region until a predetermined end point after reaching stoichiometry and before shifting to a lean region at a time of switching the target air-fuel ratio from rich to lean, or an oxygen emission amount that is calculated by using an exhaust air-fuel ratio detected by the downstream side air-fuel ratio sensor in an emission time period from a predetermined starting point in the lean region until a predetermined end point after reaching stoichiometry and before shifting to the rich region at a time of switching the target air-fuel ratio from lean to rich.

A second aspect of the present invention is the catalyst-degradation detection device according to the first aspect, further comprising:

an upstream side air-fuel ratio sensor that detects an exhaust air-fuel ratio at an upstream side from the three-way catalyst; and exhaust emission purification capacity determining means that determines degradation relating to an exhaust emission purification capacity of the three-way catalyst by using the exhaust air-fuel ratios that are detected by the upstream side air-fuel ratio sensor and the downstream side air-fuel ratio sensor during execution of the air-fuel ratio active control, wherein the exhaust emission purification capacity determining means determines degradation relating to the exhaust emission purification capacity of the three-way catalyst by using an oxygen storage change speed that is calculated by using the exhaust air-fuel ratios that are detected by the upstream side air-fuel ratio sensor and the downstream side air-fuel ratio sensor in the storage time period, or an oxygen emission change speed that is calculated by using the exhaust air-fuel ratio detected by the upstream side air-fuel ratio sensor and the downstream side air-fuel ratio sensor in the emission time period.

A third aspect of the present invention is the catalyst-degradation detection device according to the second aspect, further comprising:

degradation state identifying means that identifies a degradation state of the three-way catalyst by using a first index obtained from the oxygen storage amount or the oxygen emission amount, and a second index obtained from the oxygen storage change speed or the oxygen emission change speed.

A fourth aspect of the present invention is the catalyst-degradation detection device according to the third aspect, wherein the degradation state identifying means identifies the three-way catalyst as being in a thermal degradation state when a deviation between an initial storage/emission amount set as an oxygen storage amount or an oxygen emission amount that is calculated in an initial state of the three-way catalyst, and the first index is a first predetermined amount or more, or when a deviation between an initial change speed set as an oxygen storage change speed or an oxygen emission change speed that is calculated in the initial state of the three-way catalyst, and the second index is a second predetermined amount or more.

A fifth aspect of the present invention is the catalyst-degradation detection device according to the third aspect, wherein the degradation state identifying means identifies the three-way catalyst as being in a dissolved loss state when the deviation between the initial storage/emission amount and the first index is a third predetermined amount that is larger than the first predetermined amount or more, and the deviation between the initial change speed and the second index is a fourth predetermined amount that is larger than the second predetermined amount or more.

A sixth aspect of the present invention is the catalyst-degradation detection device according to the third aspect, wherein the degradation state identifying means identifies the three-way catalyst as being in a clogged state when the deviation between the initial storage/emission amount and the first index is the first predetermined amount or more, and the deviation between the initial change speed and the second index is a fifth predetermined amount that is smaller than the second predetermined amount or less.

A seventh aspect of the present invention is the catalyst-degradation detection device according to the third aspect, wherein the degradation state identifying means identifies the three-way catalyst as being in a temporarily poisoned state when in a case in which the deviation between the initial storage/emission amount and the first index is the first predetermined amount or more, and the deviation between the initial change speed and the second index is the second predetermined amount or more, an operation is performed under a predetermined restoration condition from poisoning, and thereafter, the deviation between the initial storage/emission amount and the first index becomes less than the first predetermined amount, and the deviation between the initial change speed and the second index becomes less than the second predetermined amount.

An eighth aspect of the present invention is the catalyst-degradation detection device according to the third aspect, wherein the degradation state identifying means identifies the three-way catalyst as being in a matrix cracking state when the deviation between the initial storage/emission amount and the first index is the third predetermined amount or more, and the deviation between the initial change speed and the second index is the fifth predetermined amount or less.

A ninth aspect of the present invention is the catalyst-degradation detection device according to the any one of the first to the eighth aspects, wherein the oxygen storage capacity degradation determining means determines degradation relating to the oxygen storage capacity of the three-way catalyst by using the oxygen storage amount.

A tenth aspect of the present invention is the catalyst-degradation detection device according to the any one of the second to the ninth aspects, wherein the exhaust emission purification capacity determining means determines degradation relating to the exhaust emission purification capacity of the three-way catalyst by using the oxygen storage change speed.

An eleventh aspect of the present invention is the catalyst-degradation detection device according to the any one of the first to the tenth aspects, wherein the air-fuel ratio active control means executes rich-specific air-fuel ratio active control that forcefully and periodically switches the target air-fuel ratio to a richer side and a leaner side than stoichiometry by switching the target air-fuel ratio from lean to rich, immediately after the storage time period elapses.

Advantageous Effects of Invention

The oxygen storage amount is calculated by using the exhaust air-fuel ratio that is detected by the downstream side air-fuel ratio sensor in the storage time period from the predetermined starting point in the rich region until the predetermined end point after the air-fuel ratio reaches stoichiometry and also before the air-fuel ratio shifts to the lean region, when the target air-fuel ratio is switched from rich to lean. Further, the oxygen emission amount is calculated by using the exhaust air-fuel ratio that is detected by the downstream side air-fuel ratio sensor in the emission time period from the predetermined starting point in the lean region until the predetermined end point after the air-fuel ratio reaches stoichiometry and also before the air-fuel ratio shifts to the rich region, when the target air-fuel ratio is switched from lean to rich. Namely, the above described oxygen storage amount or the above described oxygen emission amount can be said to be the result of calculating the oxygen amount that is stored in or emitted from the three-way catalyst in the storage time period or the emission time period that also includes the time period before the air-fuel ratio reaches stoichiometry, in addition to the above described stoichiometry holding time period. In this regard, in the first invention, the above described oxygen storage amount or the above described oxygen emission amount is calculated by the oxygen storage capacity degradation determining means, and therefore, even if the above described stoichiometry holding time period is reduced by the shift to rich, degradation relating to the three-way catalyst oxygen storage capacity can be detected with high precision by the above described oxygen storage amount or oxygen emission amount that is calculated. Thereby, even if the use amount of the catalyst is reduced, the degradation determination of the three-way catalyst can be performed with high precision.

The oxygen storage change speed is correlated with the oxidation-reduction capacity of the three-way catalyst in the above described storage time period, and the oxygen emission change speed is correlated with the oxidation-reduction capacity of the three-way catalyst in the above described emission time period. In this regard, in the second invention, the above described oxygen storage change speed or the above described oxygen emission change speed is calculated by the exhaust emission purification capacity determining means, and therefore, degradation relating to the oxidation-reduction capacity of the three-way catalyst can be detected with high precision by the above described oxygen storage change speed or oxygen emission change speed that is calculated. Thereby, degradation determination of the three-way catalyst can be performed with high precision.

According to the third to the eighth inventions, the degradation state of the three-way catalyst can be identified by using the first index that is obtained from the above described oxygen storage amount or oxygen emission amount, and the second index that is obtained from the above described oxygen storage change speed or oxygen emission change speed. More specifically, the three-way catalyst can be identified as being in a thermal degradation state when the deviation between the initial storage/emission amount set as an oxygen storage amount or an oxygen emission amount in the initial state of the three-way catalyst, and the first index is the first predetermined amount or more, or when the deviation between the initial change speed set as an oxygen storage change speed or an oxygen emission change speed in the initial state of the three-way catalyst, and the second index is the second predetermined amount or more (the fourth invention). Further, the three-way catalyst can be identified as being in a dissolved loss state when the deviation between the above described initial storage/emission amount and the above described first index is the third predetermined amount that is larger than the above described first predetermined amount or more, and the deviation between the above described initial change speed and the above described second index is the fourth predetermined amount that is larger than the above described second predetermined amount or more (the fifth invention). Further, the three-way catalyst can be identified as being in a clogged state when the deviation between the above described initial storage/emission amount and the above described first index is the above described first predetermined amount or more, and the deviation between the above described initial change speed and the above described second index is the fifth predetermined amount that is smaller than the above described second predetermined amount or less (the sixth invention). Further, the three-way catalyst can be identified as being in a temporarily poisoned state when in a case in which the deviation between the above described initial storage/emission amount and the above described first index is the above described first predetermined amount or more, and the deviation between the above described initial change speed and the above described second index is the second predetermined amount or more, an operation is performed under the predetermined restoration condition from poisoning, and thereafter, the deviation between the above described initial storage/emission amount and the above described first index becomes less than the first predetermined amount, and the deviation between the above described initial change speed and the above described second index becomes less than the second predetermined amount (the seventh invention). Further, the three-way catalyst can be identified as being in a matrix cracking state when the deviation between the above described initial storage/emission amount and the above described first index is the above described third predetermined amount or more, and the deviation between the above described initial change speed and the above described second index is the above described fifth predetermined amount or less (the eighth invention).

In general, the oxygen storage reaction by which oxygen is adsorbed and stored in the three-way catalyst more easily advances than the oxygen emission reaction by which oxygen is emitted from the three-way catalyst. Therefore, when the oxygen storage amount and the oxygen storage change speed are used, degradation detectability can be enhanced more as compared with the case of using the oxygen emission amount and the oxygen emission change speed. In this regard, in the ninth and the tenth inventions, the oxygen storage amount and the oxygen storage change speed are used, and therefore, degradation determination of the three-way catalyst can be performed with higher precision.

During execution of air-fuel ratio active control, the target air-fuel ratio is switched in a short period of time, and therefore, there arises the problem that emission is easily worsened, and especially at the lean side, unpurified NOx is discharged to the downstream side of the three-way catalyst. In this regard, in the eleventh invention, rich-specific air-fuel ratio active control is executed, and the target air-fuel ratio is switched from lean to rich immediately after a lapse of the storage time period, and therefore, NOx discharge at the lean side can be suppressed. Accordingly, worsening of the exhaust emission can be prevented.

DESCRIPTION OF EMBODIMENT

Embodiment 1

Configuration of Catalyst-Degradation Detection Device

Figure 1:
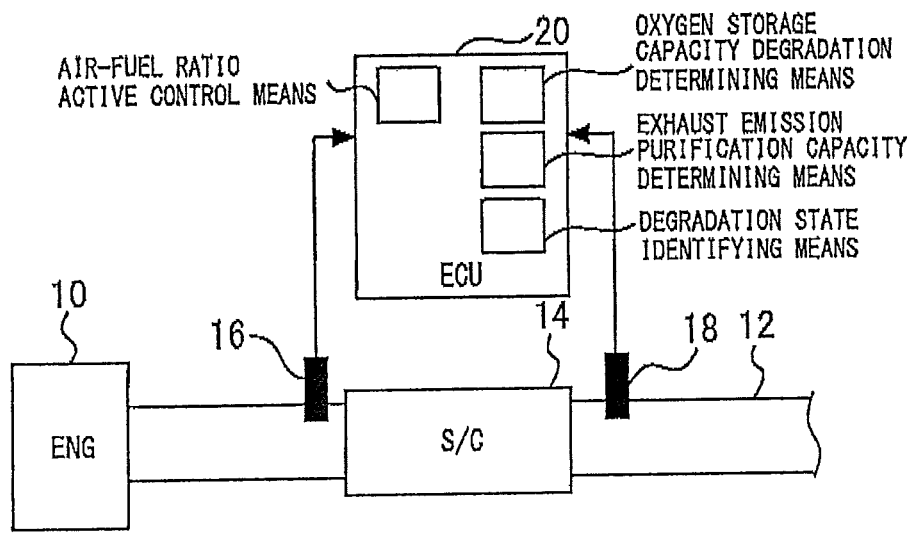
FIG. 1 is a view showing a system configuration of a catalyst-degradation detection device of the present embodiment.

First, with reference to FIGS. 1 to 7, embodiment 1 of the present invention will be described. FIG. 1 is a view showing a system configuration of a catalyst-degradation detection device of the present embodiment. As shown in FIG. 1, a system of the present embodiment includes an engine 10 as a vehicle power unit. In an exhaust passage 12 of the engine 10, an S/C 14 is disposed. The S/C 14 is a three-way catalyst that efficiently purifies three components of HC, CO and NOx in exhaust emission when an air-fuel ratio of exhaust emission that flows therein is in a narrow range in the vicinity of stoichiometry.

The three-way catalyst is made by coating a cordierite carrier formed into a honeycomb shape with porous alumina, and causing the alumina to carry precious metal catalysts such as platinum (Pt), palladium (Pd) and rhodium (Rh). Further, by the three-way catalyst, metal cerium (Ce) as an additive is further carried. The metal cerium has the property of combining with oxygen in exhaust emission to form ceria ($CeO_2$) when the air-fuel ratio of the exhaust emission that flows into the S/C 14 is lean, and returning to the metal cerium by emitting oxygen when the air-fuel ratio of the exhaust emission is rich. Therefore, the three-way catalyst has the ability to adsorb and store oxygen in the exhaust emission when the exhaust air-fuel ratio is lean, and emit the oxygen that is adsorbed and stored when the exhaust air-fuel ratio becomes rich, by the action of the metal cerium.

Further, as shown in FIG. 1, at an upstream side and a downstream side of the S/C 14, A/F sensors 16 and 18 are respectively disposed. The A/F sensors 16 and 18 are, for example, limiting current type air-fuel ratio sensors, and output signals corresponding to the air-fuel ratio of the exhaust emission that flows into the S/C 14 and the air-fuel ratio of the exhaust emission that passes through the S/C 14.

Further, the system of the present embodiment includes an ECU (Electronic Control Unit) 20. To an input side of the ECU 20, the aforementioned A/F sensors 16 and 18, and various other sensors necessary for control of the vehicle and the engine 10 are connected. Meanwhile, to an output side of the ECU 20, various actuators such as an injector (not illustrated) that injects fuel to the engine 10 are connected.

[Air-Fuel Ratio Behavior During Air-Fuel Ratio Active Control]

Figure 2:
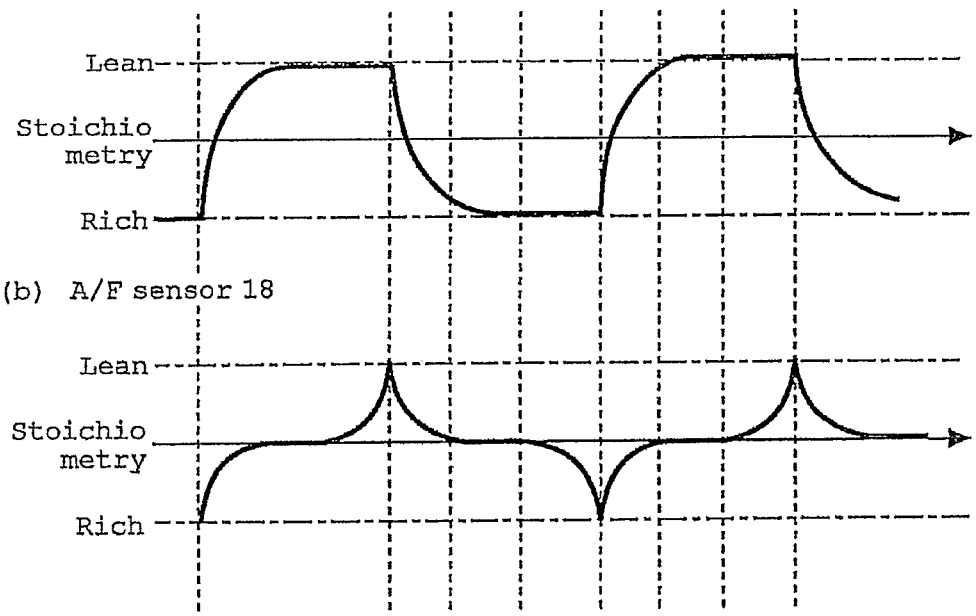
FIG. 2 is a view describing an air-fuel ratio behavior during air-fuel ratio active control.

Next, with reference to FIG. 2, an air-fuel ratio behavior during air-fuel ratio active control will be described. During the air-fuel ratio active control, the ECU 20 forcefully and periodically increases and decreases a fuel injection amount to a rich side or a lean side with a base fuel injection amount with which the air-fuel ratio becomes a target value (for example, stoichiometry) as a reference. Therefore, the A/F sensor 16 outputs signals responding to increase and decrease of the fuel injection amount, and a value thereof changes from a predetermined value at a rich side to a predetermined value at a lean side (or from a predetermined value at the lean side to a predetermined value at the rich side) (FIG. 2(a)). Meanwhile, in the A/F sensor 18, a certain time period is required until a value thereof changes from a predetermined value at the rich side to a predetermined value at the lean side (or from a predetermined value at the lean side to a predetermined value at the rich side) (FIG. 2(b)). This is because the action of the metal cerium described above is related thereto.

When an air-fuel ratio of the exhaust emission that flows into the S/C 14 (hereinafter, called "an upstream side A/F") is changed from rich to lean, the S/C 14 starts to store oxygen in the exhaust emission. Therefore, an exhaust air-fuel ratio that is detected by the A/F sensor 18 (hereinafter, called "a downstream side A/F") does not abruptly changes from rich to lean, but temporarily remains in the vicinity of stoichiometry. However, due to the influence of the aforementioned shift to rich, the time period in which the downstream side A/F remains in the vicinity of stoichiometry, namely, a stoichiometry holding time period is short. When the OSC of the metal cerium reaches the limit during the stoichiometry holding time period, the downstream side A/F changes from stoichiometry to lean.

When the upstream side A/F is changed from lean to rich, the story is the other way around. Namely, when the upstream side A/F is changed from lean to rich, the ceria starts to emit oxygen into the exhaust emission. Therefore, the downstream side A/F does not abruptly change to rich, but temporarily remains in the vicinity of stoichiometry. When all oxygen is completely emitted, the downstream side A/F changes from stoichiometry to lean.

[Method for Detecting Catalyst Degradation in Embodiment 1]

Incidentally, when the three-way catalyst degrades, the action of the metal cerium is also influenced, and therefore, the amount of oxygen stored by the metal cerium during a storage cycle, or the amount of oxygen emitted by the ceria during an emission cycle (Hereinafter, they will be generically called "an oxygen storage amount OSA") decreases as compared with that at a normal time. Thus, in the present embodiment, the oxygen storage amount OSA is obtained on the basis of the output value of the A/F sensor 18 until a time just before the downstream side A/F shifts to a lean region in the storage cycle, and until a time just before the downstream side A/F shifts to a rich region in the emission cycle, and degradation relating to the OSC of the three-way catalyst is detected.

Figure 3:
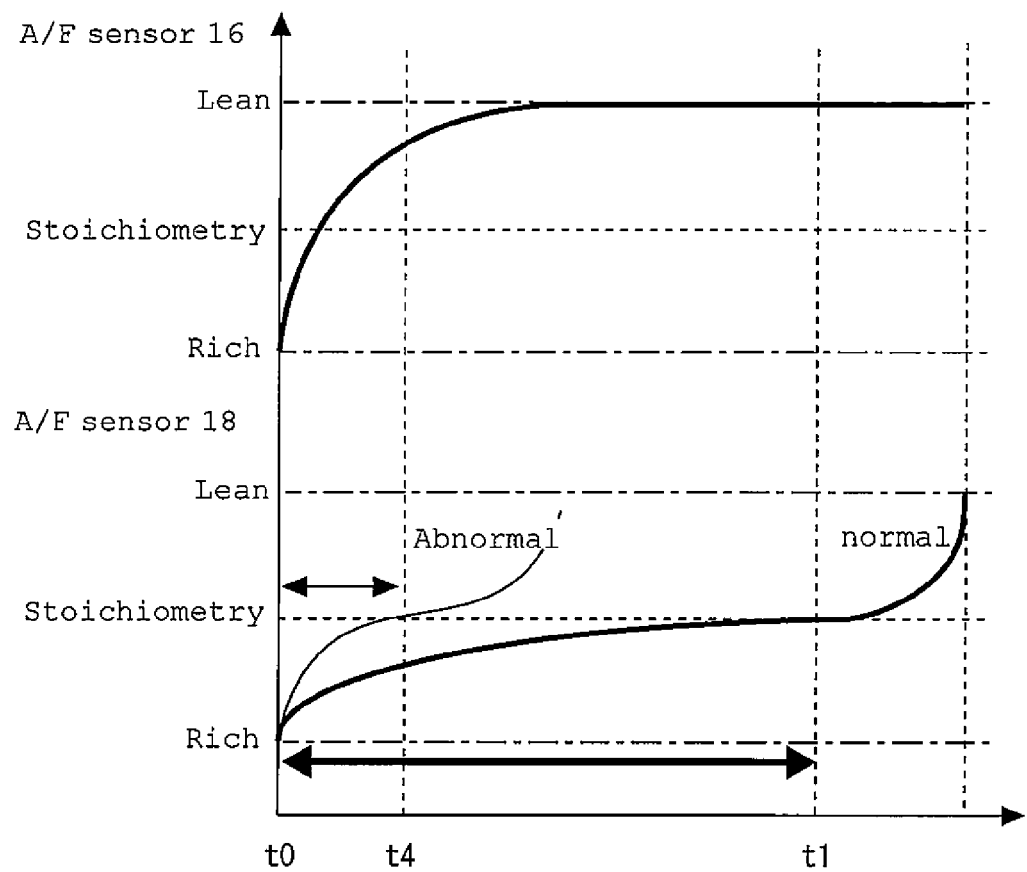
FIG. 3 is a diagram showing the air-fuel ratio behavior during the storage cycle.
Figure 4:
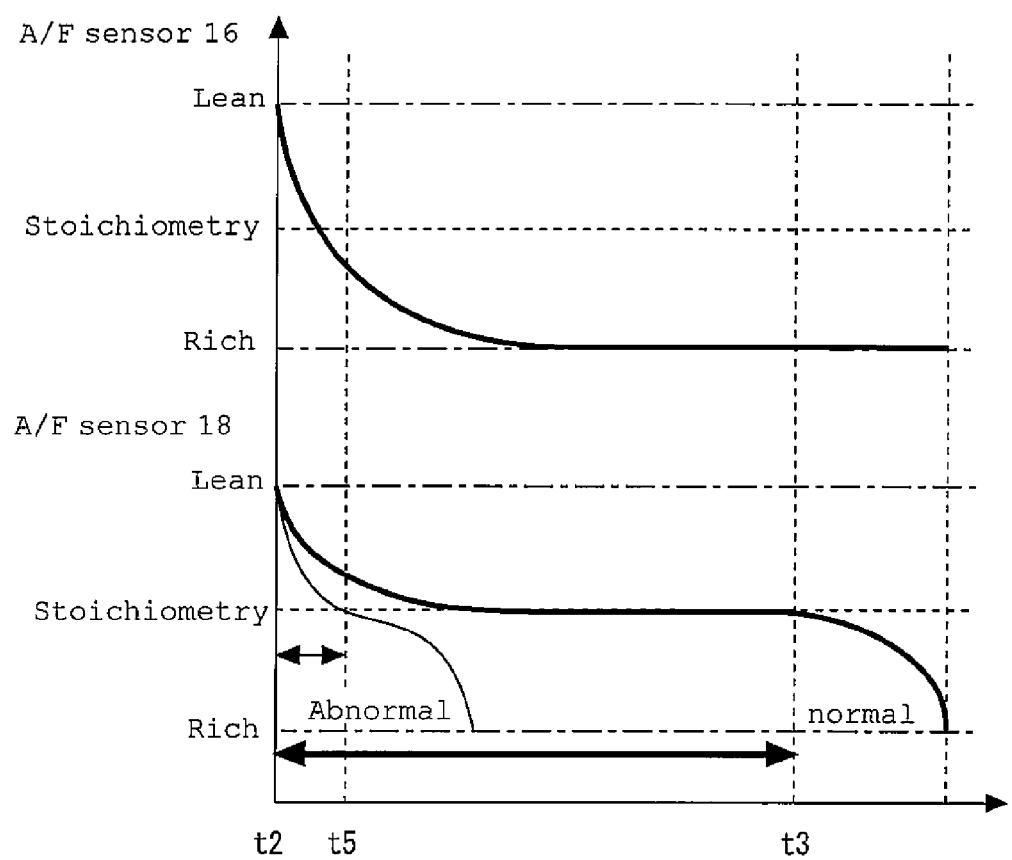
FIG. 4 is a diagram showing the air-fuel ratio behavior in the emission cycle.

A method for calculating the oxygen storage amount OSA will be described with reference to FIGS. 3 and 4. FIG. 3 is a diagram showing the air-fuel ratio behavior during the storage cycle. In the storage cycle, a target air-fuel ratio is set so that the upstream side A/F changes from rich to lean. Therefore, the downstream side A/F changes from stoichiometry to lean at a time $t_1$ after reaching stoichiometry. FIG. 4 is a diagram showing the air-fuel ratio behavior in the emission cycle. In the emission cycle, a target air-fuel ratio is set so that the upstream side A/F changes from lean to rich. Therefore, the downstream side A/F changes from stoichiometry to rich at a time $t_3$ after reaching stoichiometry.

The oxygen storage amount OSA is calculated on the basis of an output value of the A/F sensor 18 in a time period from $t_0$ to $t_1$ of FIG. 3, or a time period from $t_2$ to $t_3$ of FIG. 4. More specifically, the oxygen storage amount OSA is calculated from the following equation (1).

$$\text{Oxygen storage amount OSA}=\Sigma(\text{oxygen mass ratio } K\times\Delta A/F\times\text{fuel injection amount } Q) \quad (1)$$

In the above described equation (1), the oxygen mass ratio K is 0.23, and $\Delta A/F$ is |output value of the A/F sensor 18–stoichiometry A/F (14.6)|.

There are two reasons why the calculation target time period of the oxygen storage amount OSA is set to be the above described periods. The first reason is to exclude the change of the downstream side A/F after shift to the lean region (or after shift to the rich region). As described above, storage of oxygen during the storage cycle, and emission of oxygen during the emission cycle are performed before end of the stoichiometry time period. Namely, after shift to the lean region, inflow gas directly passes through the S/C 14, and exerts an influence on the output value of the downstream side A/F. In this regard, if the change after shift to the lean region is excluded, a variation in calculation of the oxygen storage amount OSA can be suppressed.

The second reason is to take an amount of shift to rich into consideration. As described above, when degradation of the three-way catalyst does not advance so much, a shift to rich is caused by $H_2$ that is generated during the storage cycle, and the stoichiometry holding time period is reduced. In this regard, the above described time period also includes the time period before reaching stoichiometry in addition to the stoichiometry holding time period, and therefore, reduction in precision of calculation of the oxygen storage amount OSA by the shift to rich can be prevented.

Detection of degradation to the OSC of the three-way catalyst is performed by comparison with a threshold value of the oxygen storage amount OSA. When the three-way catalyst degrades, the downstream side NF shifts to the lean region at a time $t_4$, and shifts to the rich region at a time $t_5$, as shown in FIGS. 3 and 4. Therefore, the oxygen storage amount OSA that is calculated becomes extremely small as compared with the oxygen storage amount OSA at the normal time (More specifically, the oxygen storage amount OSA in an initial state of the three-way catalyst. The same shall apply hereinafter.). In the present embodiment, after the threshold value like this is set in advance, the threshold value is stored inside the ECU 20.

Further, in the present embodiment, temperature correction is performed for the calculated oxygen storage amount OSA. This is because the OSC of the metal cerium has a temperature characteristic, and by a difference in bed temperature thereof, a variation occurs to the calculated oxygen storage amount OSA. The temperature correction is performed by correcting the oxygen storage OSA to a value corresponding to a normalized temperature (for example, 750° C.) after the oxygen storage OSA is calculated. More specifically, the temperature correction value of the oxygen storage amount OSA is calculated from the following equation (2).

$$\text{Oxygen storage amount OSA(correction value)}=\text{oxygen storage amount OSA (calculated value)}+\text{gradient } K\times(\text{normalized temperature}(°\text{C.})-\text{calculation time S/C estimated temperature}(°\text{C.})) \quad (2)$$

In the above described equation (2), the gradient K can be obtained from a graph defining a relation of the S/C estimated temperature and the oxygen storage amount OSA. Note that the graph can be separately created by an experiment or the like.

[Specific Processing in Embodiment 1]

Figure 5:
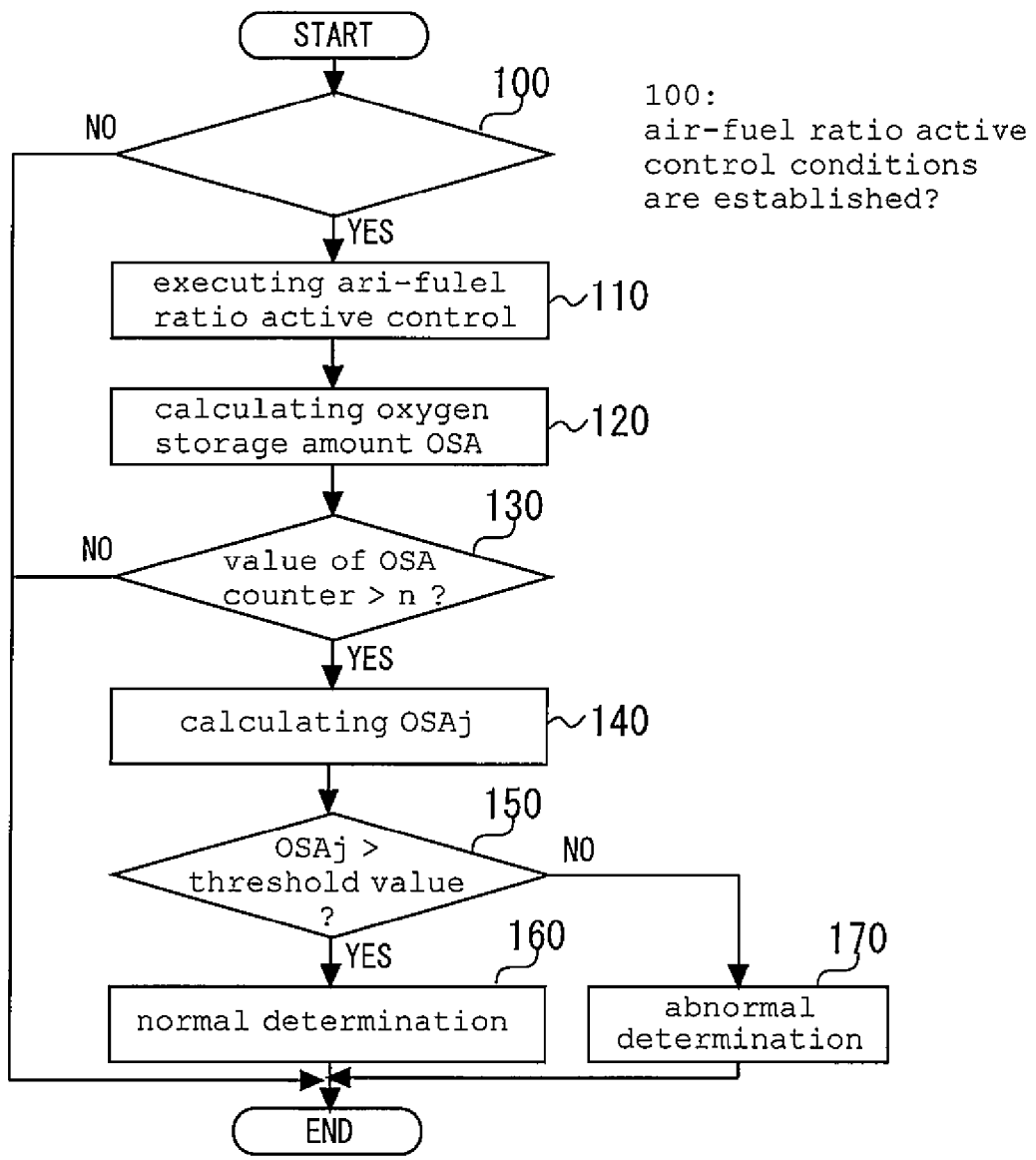
FIG. 5 is a flowchart showing a catalyst degradation detection routine that is executed by the ECU 20 in the first embodiment.

Next, with reference to FIG. 5, specific processing for realizing the aforementioned function will be described. FIG. 5 is a flowchart showing a catalyst degradation detection routine that is executed by the ECU 20 in the present embodiment. Note that the routine shown in FIG. 5 is regularly executed repeatedly.

In the routine shown in FIG. 5, the ECU 20 initially determines whether or not air-fuel ratio active control conditions are established (step 100). In the present step, the ECU 20 determines whether or not the engine is under the conditions in which the ECU 20 can stably calculate the oxygen storage amount OSA. More specifically, the ECU 20 determines whether it is after warming-up of the engine, whether the A/F sensors 16 and 18 are normal and active, whether the engine is in a steady state operation, whether a predetermined time elapses after a fuel cut operation (F/C operation), and the like. When it is determined that the engine is under the above described calculation conditions, the ECU 20 proceeds to step 110, and executes the air-fuel ratio active control. Meanwhile, when it is determined that the engine is not under the above described calculation conditions, the ECU 20 ends the present routine.

Figure 6:
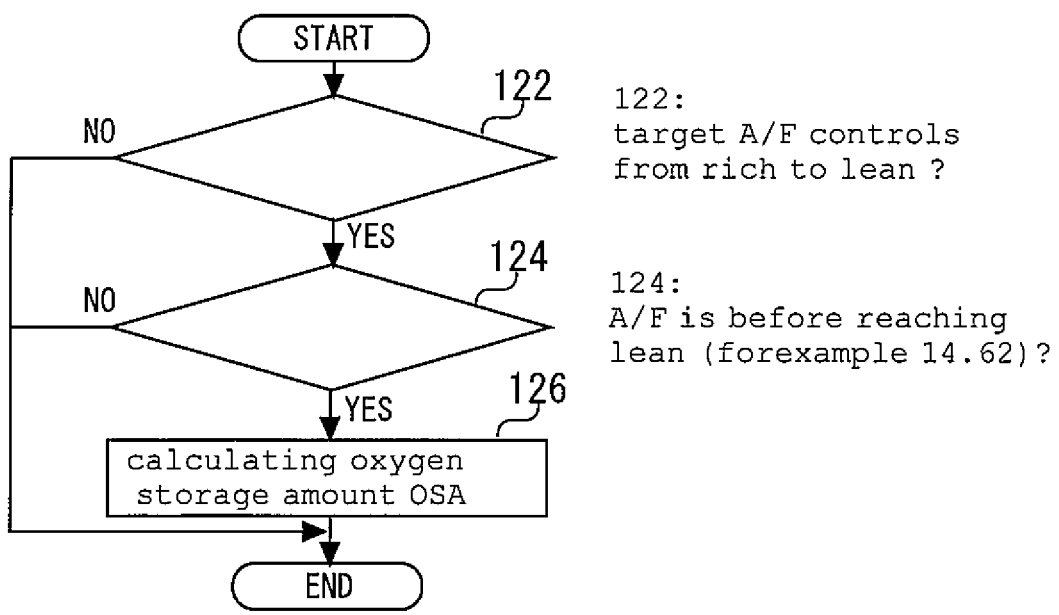
FIG. 6 is a flowchart of a subroutine showing processing of step 120 in FIG. 5.

After step 110, the ECU 20 calculates the oxygen storage amount OSA (step 120). FIG. 6 is a flowchart of a subroutine showing processing of step 120. In the present routine, the ECU 20 initially determines whether or not the target air-fuel ratio is set so that the upstream side A/F changes from rich to lean (step 122). When it is determined that setting of the target air-fuel ratio from rich to lean is performed in step 122, the ECU 20 determines whether or not the downstream A/F reaches lean (for example, 14.62) (step 124). Meanwhile, when it is determined that the target air fuel ratio is set in the opposite direction from the above description in step 122, the ECU 20 ends the present routine.

When it is determined that the downstream A/F is before reaching lean in step 124, the ECU 20 calculates the oxygen storage amount OSA and updates the number of execution times of an OSA counter (step 126). The calculation method of the oxygen storage amount OSA is as already described. Further, the number of execution times of the OSA counter is counted once at each calculation of the oxygen storage amount OSA. Meanwhile, when it is determined that the downstream A/F reaches lean in step 124, the ECU 20 ends the present routine, and proceeds to step 130 of FIG. 5.

In step 130, the ECU 20 determines whether or not a value of the OSA counter is n or more. When it is determined that the value of the OSA counter is n or more in the present step, the ECU 20 proceeds to step 140. Meanwhile, when it is determined that the value of the OSA counter is smaller than n in step 130, it can be determined that the number of calculation times of the oxygen storage amount OSA is small. Therefore, the ECU 20 ends the present routine so as to calculate the oxygen storage amount OSA again. Note that as the counter value of step 130, the value that is set in advance and stored in the ECU 20 is used.

In step 140, the ECU 20 calculates an average value OSAj of the oxygen storage amount OSA. More specifically, the ECU 20 initially performs temperature correction for the oxygen storage amount OSA calculated in step 126, adds up the oxygen storage amounts OSA after temperature correction next, and finally divides the added result by the OSA counter value, whereby the ECU 20 obtains the average value OSAj. Note that the temperature correction method for the oxygen storage amount OSA is as already described.

After step 140, the ECU 20 determines whether or not the average value OSAj of the oxygen storage amount OSA is larger than a threshold value (step 150). When it is determined that the average value OSAj is larger than the threshold value, the ECU 20 proceeds to step 160, and determines that the OSC of the three-way catalyst is normal. Meanwhile, when it is determined that the average value OSAj is the threshold value or less, the ECU 20 proceeds to step 170, and determines that the OSC of the three-way catalyst is abnormal. Note that as the threshold value of step 150, a value that is set in advance and stored in the ECU 20 is used.

As above, according to the routine shown in FIG. 5, when it is determined that the average value OSAj of the oxygen storage amount OSA is larger than the threshold value, it is determined that the OSC of the three-way catalyst is normal, and when it is determined that the average value OSAj of the oxygen storage amount OSA is the threshold value or less, it can be determined that the OSC of the three-way catalyst is abnormal. Accordingly, degradation relating to the OSC of the three-way catalyst can be detected with high precision.

Figure 7:
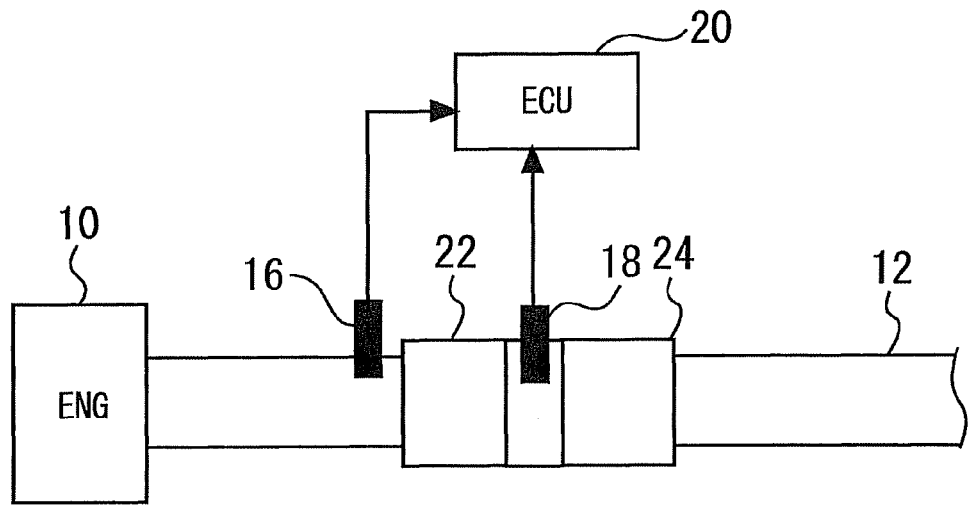
FIG. 7 is a view showing a configuration of the tandem catalyst.

Incidentally, in the above described embodiment 1, the A/F sensor 18 is disposed in the exhaust passage 12 at the downstream side of the S/C 14, but when the S/C 14 is a tandem catalyst that is disposed in the exhaust passage of a diesel engine or the like, the disposition spot thereof may be changed. FIG. 7 is a view showing a configuration of the tandem catalyst. As shown in FIG. 7, the tandem catalyst is configured by a three-way catalyst 22, and a PM filter catalyst (DPF) 24 that collects PM in exhaust gas. Therefore, if the A/F 18 is disposed between the three-way catalyst 22 and the PM filter catalyst 24, the downstream side A/F can be detected similarly to the present embodiment. In this manner, the disposition spot of the A/F 18 is not limited to the example of the present embodiment, and various modifications can be made as long as the exhaust air-fuel ratio at the downstream side from the three-way catalyst 22 can be detected.

Further, in the above described embodiment 1, in the subroutine of FIG. 6, when the changing direction of the target air-fuel ratio is from rich to lean, the oxygen storage amount OSA is calculated. This is because oxygen storage reaction to the metal cerium advances more easily than oxygen emission reaction from the ceria, and therefore, if the oxygen storage amount OSA in the storage cycle is used, the degradation detectability can be enhanced. However, this does not mean exclusion of calculation of the oxygen storage amount OSA in the emission cycle. Namely, when the changing direction of the target air-fuel ratio is from lean to rich, the oxygen storage amount OSA may be calculated. In this case, the processing in steps 122 and 124 is executed by being changed as follows. Namely, the processing of step 122 is changed to determining whether or not the changing direction of the target air-fuel ratio is from lean to rich, and the processing of step 124 is changed to determining whether or not the downstream side A/F is before reaching rich (for example, 14.58). By the processing after being changed like this, degradation relating to the OSC of the three-way catalyst also can be detected with high precision. Note that the present modification also can be applied similarly in embodiment 3 that will be described later.

Note that in the above described embodiment 1, the S/C 14 corresponds to the "three-way catalyst" in the above described first invention, and the A/F sensor 18 corresponds to the "downstream side air-fuel ratio sensor" in the above described first invention, respectively.

Further, in the above described embodiment 1, the ECU 20 executes the processing of step 110 of FIG. 5, whereby the "air-fuel ratio active control means" in the above described first invention is realized, and the ECU 20 executes the processing of steps 120 to 170 of FIG. 5, whereby the "oxygen storage capacity degradation determining means" in the above described first invention is realized, respectively.

Embodiment 2

Next, with reference to FIGS. 8 to 12, embodiment 2 of the present invention will be described. In the present embodiment, it is a feature thereof to execute a catalyst degradation detection routine shown in FIG. 11 in the device configuration in FIG. 1. Therefore, description of the device configuration will be omitted.

[Method for Detecting Catalyst Degradation in Embodiment 2]

In the above described embodiment 1, the oxygen storage amount OSA is obtained on the basis of the output value of the A/F sensor 18 until a time just before the downstream side A/F shifts to the lean region in the storage cycle, and until a time just before the downstream side A/F shifts to the rich region in the emission cycle, and degradation relating to the OSC of the three-way catalyst is detected. In the present embodiment, a reaction speed (hereinafter, called "a reaction speed VOSA") of the exhaust emission purifying reaction is obtained on the basis of the output values of the A/F sensors 16 and 18 in the same time period, and degradation relating to the oxidation-reduction capacity of the three-way catalyst is detected.

Figure 8:
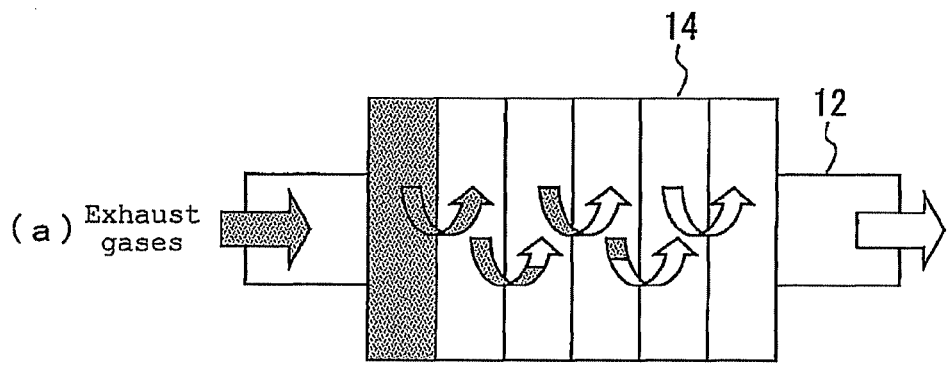
FIG. 8 is an image diagram of exhaust emission purification in the S/C 14 during air-fuel ratio active control.
Figure 8:
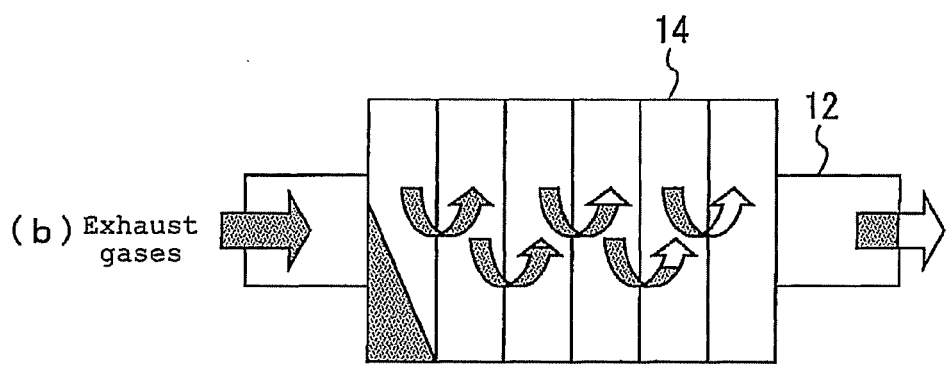

FIG. 8 is an image diagram of exhaust emission purification in the S/C 14 during air-fuel ratio active control. FIG. 8(*a*) is an exhaust emission purification image at a time of a normal catalyst. At the time of the normal catalyst, not only the OSC of the metal cerium is high, but also the oxidation-reduction capacity of the precious metal catalyst is high. Therefore, the exhaust emission purifying reaction quickly advances from a front stage of the S/C 14. Thereby, as shown in FIG. 8(*a*), a gas atmosphere at a location downstream of the S/C 14 gradually changes to an inflow gas atmosphere. Namely, when the upstream side A/F is changed from rich to lean at the time of the normal catalyst, the downstream side A/F gradually changes from rich to lean. The same applies to the case in which the upstream side A/F is changed from lean to rich, and the downstream side A/F gradually changes from lean to rich.

Meanwhile, FIG. 8(*b*) is an exhaust emission purification image at a time of an abnormal catalyst. At the time of the abnormal catalyst, the OSC of the metal cerium is low, and the oxidation-reduction capacity of the precious metal catalyst is also low. Therefore, inflow gas passes through the S/C 14 in a substantially purified state. Thereby, as shown in FIG. 8(*b*), a gas atmosphere at a location downstream of the S/C 14 substantially follows change of the inflow gas atmosphere. Namely, when the upstream side A/F is changed from rich to lean at the time of the abnormal catalyst, the downstream side A/F changes from rich to lean in a short time period. The same applies to the case in which the upstream side A/F is changed from lean to rich, and the downstream side A/F changes from lean to rich in a short time period.

Figure 9:
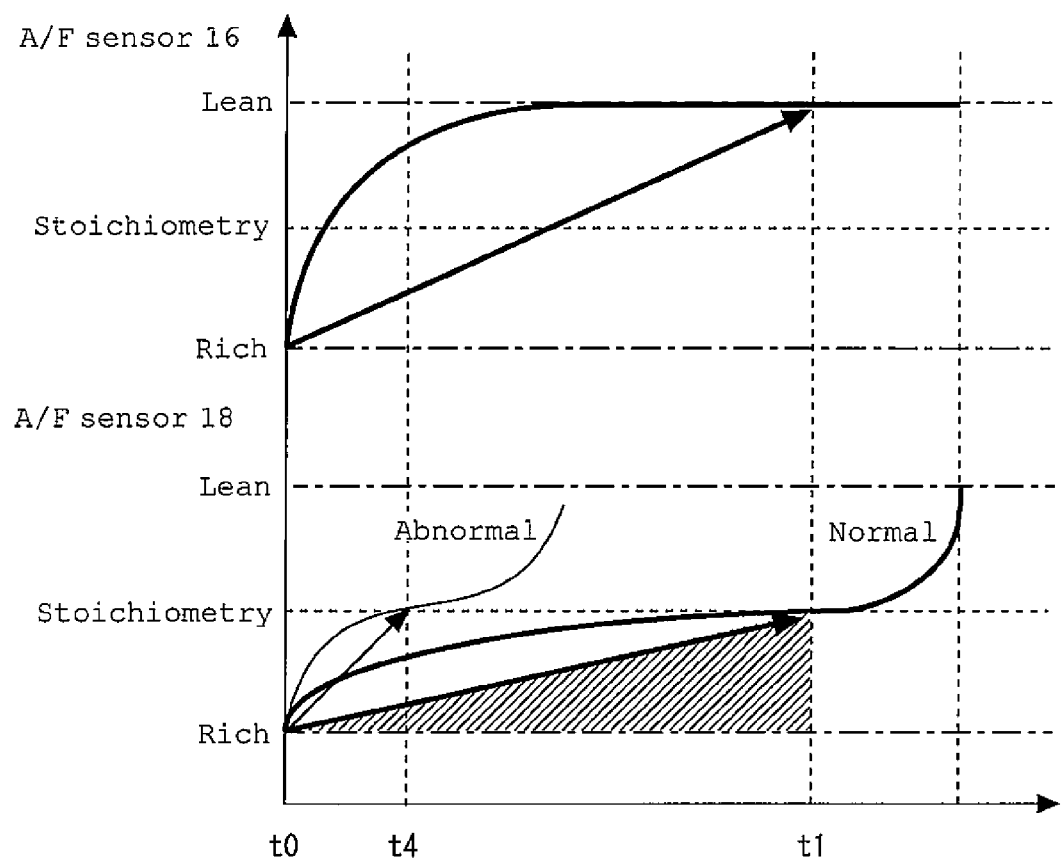
FIG. 9 is a diagram showing an air-fuel ratio behavior during the storage cycle.
Figure 10:
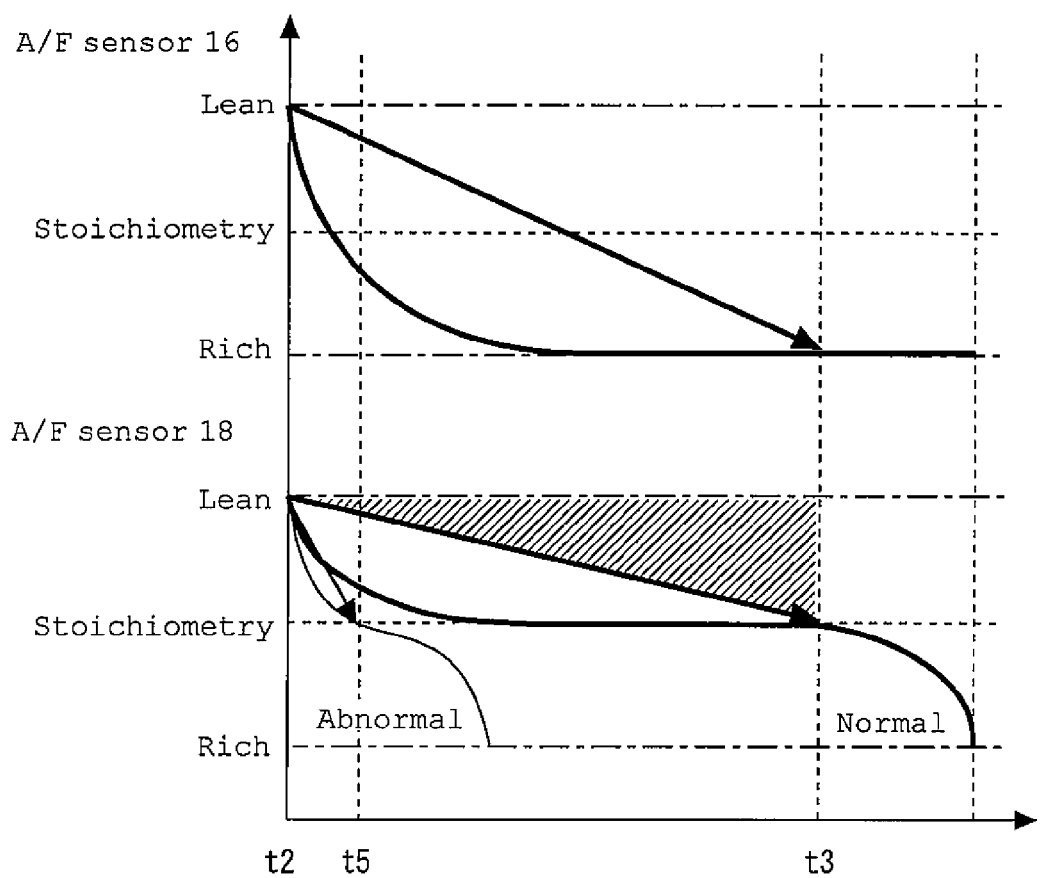
FIG. 10 is a diagram showing the air-fuel ratio behavior in the emission cycle.

A method for calculating the reaction speed VOSA will be described with reference to FIGS. 9 and 10. FIG. 9 is the same diagram as the diagram that is used at the time of explanation of FIG. 3, and is a diagram showing an air-fuel ratio behavior during the storage cycle. Further, FIG. 10 is the same diagram as the diagram that is used at the time of explanation of FIG.

4, and is a diagram showing an air-fuel ratio behavior during the emission cycle. The reaction speed VOSA is calculated on the basis of the output values of the A/F sensors 16 and 18 in a time period from a time $t_0$ to a time $t_1$ in FIG. 9, or in a time period from a time $t_2$ to a time $t_3$ in FIG. 10.

As described in the above described embodiment 1, when the upstream side A/F is changed from rich to lean, the metal cerium continues to store oxygen in the exhaust emission until the metal cerium reaches the limit of the OSC. Namely, in the time period from the time $t_0$ to the time $t_1$ in FIG. 9, the metal cerium continues to store the oxygen in the exhaust emission, and therefore, oxygen is not discharged to the downstream side of the three-way catalyst. Incidentally, during this while, the precious metal catalyst performs exhaust emission purification by using oxygen in the exhaust emission beside the metal cerium. From this, the oxygen that is stored in the metal cerium in the time period from the time $t_0$ to the time $t_1$ in FIG. 9 can be said to be the oxygen that is not provided for the exhaust emission purifying reaction, out of the oxygen that flows into the three-way catalyst. Accordingly, a ratio of an amount of oxygen that flows into the three-way catalyst (an oxygen inflow amount OSAf1) and an amount of oxygen that is stored in the metal cerium (an oxygen storage amount OSAr1) in the time period from the time $t_0$ to the time $t_1$ in FIG. 9 can be said to be correlated with the reaction speed VOSA.

Further, as is described in the above described embodiment 1, when the upstream side A/F is changed from lean to rich, the ceria continues to emit oxygen that is adsorbed and stored during the storage cycle into the exhaust emission until the ceria completely discharges the oxygen. Namely, in the time period from the time $t_2$ to the time $t_3$ in FIG. 10, the ceria continues to emit oxygen into the exhaust emission. During this while, the precious metal catalyst performs exhaust emission purification by using the emitted oxygen and the oxygen in the exhaust emission beside the ceria. From this, in the time period from the time $t_2$ to the time $t_3$ in FIG. 10, the oxygen that is emitted from the metal cerium and the oxygen that flows into the three-way catalyst can be said to be provided for the exhaust emission purifying reaction. Accordingly, in the time period from the time $t_2$ to the time $t_3$ in FIG. 10, a ratio of an amount of the oxygen that flows into the three-way catalyst (an oxygen inflow amount OSAf2) and an amount of the oxygen that is emitted from the metal cerium (an oxygen storage amount OSAr2) can be said to be correlated with the reaction speed VOSA.

In the present embodiment, the reaction speed VOSA is calculated from the following equation (3).

$$\text{Reaction speed VOSA} = \text{oxygen inflow amount OSA} fm \text{ calculated on the basis of the output value of the A/F sensor } \mathbf{16}/\text{oxygen storage amount OSA} rm \text{ calculated on the basis of the output value of the A/F sensor } \mathbf{18} \qquad (3)$$

In the above described equation (3), m is 1 or 2, the oxygen inflow amount OSAfm and the oxygen storage amount OSArm are respectively calculated on the basis of the following equations (4) and (5).

$$\text{Oxygen inflow amount OSA} fm = \Sigma(\text{oxygen mass ratio } K \times \Delta \text{A/F} fm \times \text{injection fuel amount } Q) \qquad (4)$$

$$\text{Oxygen storage amount OSA} rm = \Sigma(\text{oxygen mass ratio } K \times \Delta \text{A/F} rm \times \text{injection fuel amount } Q) \qquad (5)$$

In the above described equations (4) and (5), m is the same value as that in the above described equation (3), the oxygen mass ratio K is 0.23, $\Delta$A/Ffm is |the output value of the A/F sensor 16−stoichiometric A/F|, and $\Delta$A/Frm is |the output value of the A/F sensor 18−stoichiometric A/F|.

Degradation relating to the oxidation-reduction capacity of the three-way catalyst is performed by comparison of the reaction speed VOSA and the threshold value similarly to the above described embodiment 1. When the three-way catalyst degrades, the downstream side A/F shifts to the lean region at the time $t_4$, and shifts to the rich region at the time $t_5$, as shown in FIG. 9 and FIG. 10. Therefore, the reaction speed VOSA that is calculated becomes extremely small as compared with the reaction speed VOSA at the normal time (More specifically, the reaction speed VOSA in the initial state of the three-way catalyst. The same shall apply hereinafter.). In the present embodiment, the threshold value like this is set in advance, and thereafter, is stored in the inside of the ECU 20.

Further, in the present embodiment, temperature correction is performed for the calculated reaction speed VOSA similarly to the above described embodiment 1. This is because the oxidation-reduction capacity of the precious metal catalyst has a temperature characteristic, and by difference in bed temperature of the precious catalyst and the metal cerium (or ceria), a variation occurs to the calculated reaction speed VOSA. The temperature correction is performed by correcting the reaction speed VOSA to a value corresponding to the normalized temperature (for example, 750° C.) after calculating the reaction speed VOSA. More specifically, the temperature correction value of the reaction speed VOSA is calculated from the following equation (6).

$$\text{Reaction speed VOSA(corrected value)} = \text{reaction speed VOSA(calculated value)} + \text{gradient } K \times (\text{normalized temperature}(° \text{C.}) - \text{the calculation time S/C estimated temperature}(° \text{C.})) \qquad (6)$$

In the above described equation (6), the gradient K can be obtained from a graph defining a relation of the S/C estimated temperature and the reaction speed VOSA. Note that the graph can be created separately by an experiment or the like.

[Specific Processing in Embodiment 2]

Figure 11:
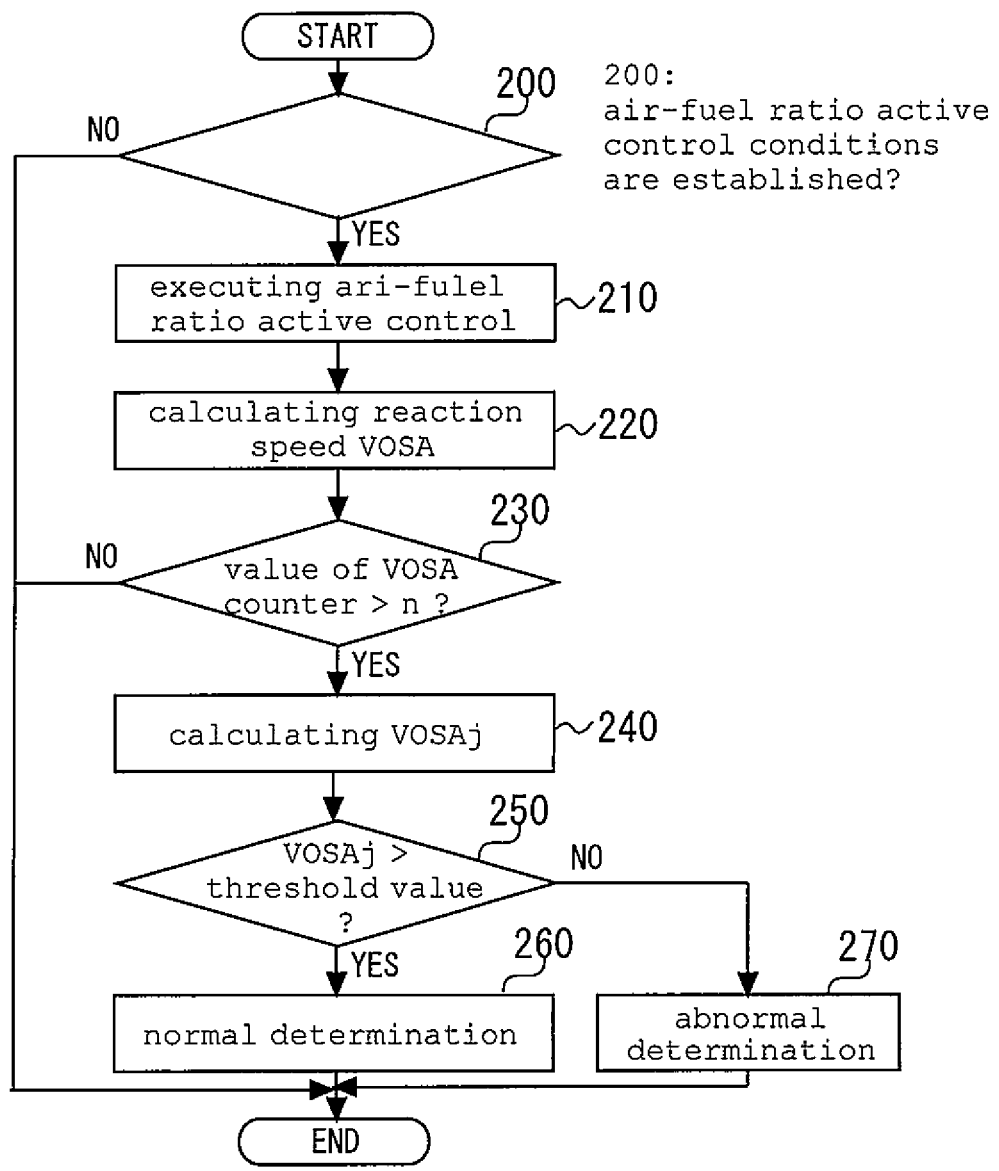
FIG. 11 is a flowchart showing a catalyst degradation detection routine that is executed by the ECU 20 in the second embodiment.

Next, with reference to FIG. 11, specific processing for realizing the aforementioned function will be described. FIG. 11 is a flowchart showing a catalyst degradation detection routine that is executed by the ECU 20 in the present embodiment. Note that the routine shown in FIG. 11 is regularly executed repeatedly.

Figure 12:
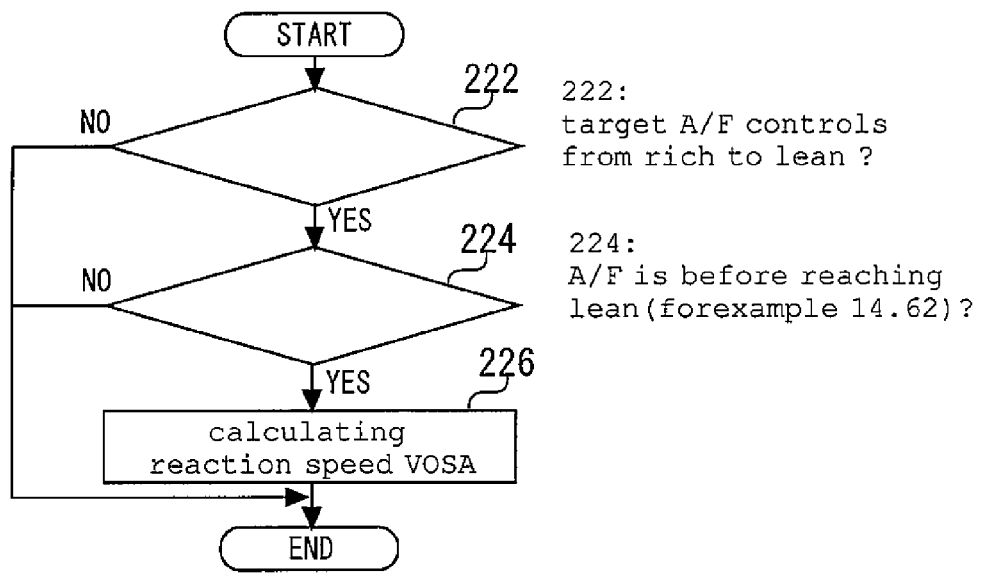
FIG. 12 is a flowchart of a subroutine that shows processing of step 220 in FIG. 11.

In the routine shown in FIG. 11, the ECU 20 initially executes processing of steps 200 and 210. The processing of steps 200 and 210 is the same as the processing of steps 100 and 110 in FIG. 5. After step 210, the ECU 20 calculates the reaction speed VOSA (step 220). FIG. 12 is a flowchart of a subroutine that shows processing of step 220. In the present routine, the ECU 20 executes processing of steps 222 and 224. The processing of steps 222 and 224 is the same as the processing of steps 122 and 124 of FIG. 6.

In step 224, when it is determined that the downstream A/F is before reaching lean, the ECU 20 calculates the reaction speed VOSA, and updates the number of execution times of a VOSA counter (step 226). The method for calculating the reaction speed VOSA is as already described. Further, the number of execution times of the VOSA counter is counted once at each calculation of the reaction speed VOSA. Meanwhile, when it is determined that the downstream A/F reaches lean in step 224, the ECU 20 ends the present routine, and proceeds to step 230.

In step 230, the ECU 20 determines whether or not a value of the VOSA counter is n or more. When it is determined that the value of the VOSA counter is n or more in the present step, the ECU 20 proceeds to step 240. Meanwhile, when it is determined that the value of the VOSA counter is smaller than n in step 230, it can be determined that the number of calculation times of the reaction speed VOSA is small. Therefore, the ECU 20 ends the present routine to calculate the reaction speed VOSA again. Note that as the counter value of step 230, a value that is set in advance and stored in the ECU 20 is used.

In step 240, the ECU 20 calculates an average value VOSAj of the reaction speeds VOSA. More specifically, the ECU 20 initially performs temperature correction for the reaction speed VOSA that is calculated in step 226, adds up the reaction speed VOSA after temperature correction next, and divides the added result by the number of the VOSA counter to obtain the average value VOSAj. Note that the method for temperature correction for the reaction speed VOSA is as already described.

After step 240, the ECU 20 determines whether or not the average value VOSAj of the reaction speed VOSA is larger than a threshold value (step 250). When it is determined that the average value VOSAj is larger than the threshold value, the ECU 20 proceeds to step 260, and determines that the oxidation-reduction capacity of the three-way catalyst is normal. Meanwhile, when it is determined that the average value VOSAj is the threshold value or less, the ECU 20 proceeds to step 270, and determines that the oxidation-reduction capacity of the three-way catalyst is abnormal. Note that as the threshold value of step 250, a value that is stored in the ECU 20 is used.

As above, according to the routine shown in FIG. 11, when it is determined that the average value VOSAj of the reaction speed VOSA is larger than the threshold value, it is determined that the oxidation-reduction capacity of the three-way catalyst is normal, and when it is determined that the average value VOSAj of the reaction speed VOSA is the threshold value or less, it can be determined that the oxidation-reduction capacity of the three-way catalyst is abnormal. Accordingly, degradation relating to the oxidation-reduction capacity of the three-way catalyst can be detected with high precision.

Incidentally, in the above described embodiment 2, in the subroutine of FIG. 12, the reaction speed VOSA is calculated when the changing direction of the target air-fuel ratio is from rich to lean. The reason thereof is as described in the above described embodiment 1. However, this does not mean exclusion of calculation of the reaction speed VOSA in the emission cycle. Namely, the reaction speed VOSA may be calculated when the changing direction of the target air-fuel ratio is from lean to rich. In this case, the processing of steps 222 and 224 is changed as follows and executed. Namely, the processing of step 222 is changed to determining whether or not the changing direction of the target air-fuel ratio is from lean to rich, and the processing of step 224 is changed to determining whether or not the downstream side A/F is before reaching rich (for example, 14.58). By the processing after being changed like this, the degradation relating to the oxidation-reduction capacity of the three-way catalyst can be detected with high precision. Note that the present modification can be similarly applied in embodiment 3 that will be described later.

Note that in the above described embodiment 2, the A/F sensor 16 corresponds to the "upstream side air-fuel ratio sensor" in the above described second invention.

Further, in the above described embodiment 2, the ECU 20 executes the processing of steps 220 to 270 of FIG. 11, whereby the "exhaust emission purification capacity determining means" in the above described second invention is realized.

Embodiment 3

Next, with reference to FIGS. 13 to 18, embodiment 3 of the present invention will be described. In the present embodiment, it is a feature thereof to identify a concrete degradation state of the three-way catalyst with use of the oxygen storage amount OSA calculated in the above described embodiment 1, and the reaction speed VOSA calculated in the above described embodiment 2. Therefore, explanation of the device configuration, and the methods for calculating the oxygen storage amount OSA and the reaction speed VOSA will be omitted.

[Method for Detecting Catalyst Degradation in Embodiment 3]

According to the above described embodiment 1, degradation relating to the OSC of the three-way catalyst can be detected, and according to the above described embodiment 2, degradation relating to the oxidation-reduction capacity of the three-way catalyst can be detected. However, in order to detect degradation of the three-way catalyst with higher precision, they are desirably detected at the same time. Further, there a plurality of causes of degradation of the three-way catalyst, and the causes of degradation of the three-way catalyst include the causes demanding immediate action as well as the causes demanding no such immediate action. Therefore, it is desirable to enable the cause of degradation of the three-way catalyst to be identified.

Thus, in the present embodiment, the concrete degradation state of the three-way catalyst is identified with use of the oxygen storage amount OSA and the reaction speed VOSA. Applicable concrete degradation states are (i) thermal degradation, (ii) dissolved loss by a misfire or the like, (iii) clogging by manganese (Mn) or the like, (iv) poisoning degradation and (v) matrix cracking. Identification of the degradation state is performed by combination of a deviation between the calculated storage amount OSA and the oxygen storage amount OSA at the normal time (hereinafter, called "an OSA deviation"), and a deviation between the calculated reaction speed VOSA and the reaction speed VOSA at the normal time (hereinafter, called "a VOSA deviation").

Figure 13:
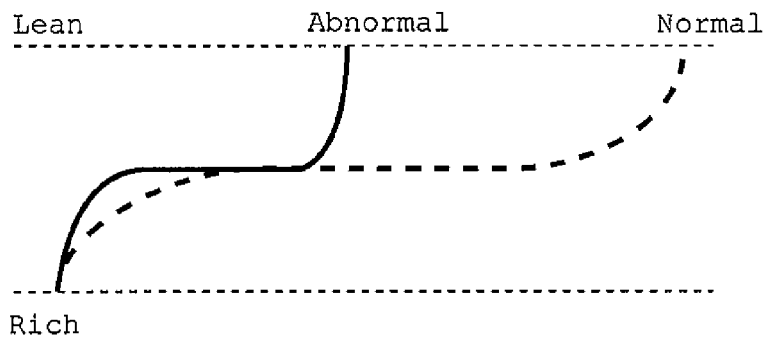
FIG. 13 is a diagram showing a behavior of the downstream side A/F at a time of thermal degradation.

In the case of (i) thermal degradation, the oxygen storage amount OSA and the reaction speed VOSA that are calculated become small. FIG. 13 is a diagram showing a behavior of the downstream side A/F at a time of thermal degradation. As shown in FIG. 13, the behavior of the downstream side A/F at the time of thermal degradation shows a behavior similar to the behavior of the downstream side A/F described in the above described embodiments 1 and 2. Namely, when the oxygen storage amount OSA and the reaction speed VOSA that are calculated are smaller than the oxygen storage amount OSA at the normal time, and the reaction speed VOSA at the normal time, three-way catalyst can be identified as being thermally degraded. More specifically, when the OSA deviation is a first predetermined amount or more, or when the VOSA deviation is a second predetermined amount or more, the degradation state is identified as thermal degradation.

Figure 14:
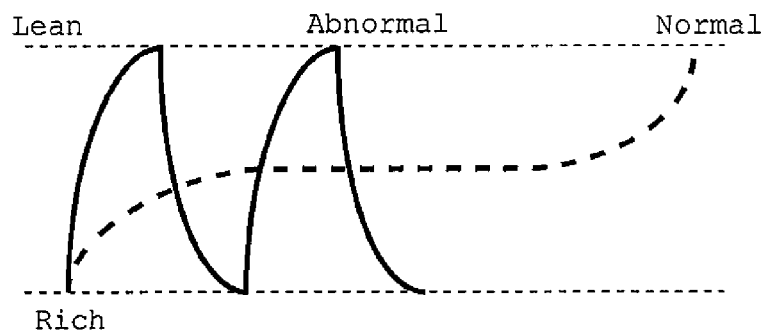
FIG. 14 is a diagram showing a behavior of the downstream side A/F at a time of dissolved loss.

In the case of (ii) dissolved loss by a misfire or the like, the function of the three-way catalyst is completely lost. FIG. 14 is a diagram showing a behavior of the downstream side A/F at a time of dissolved loss. As shown in FIG. 14, the behavior of the downstream side A/F at the time of dissolved loss is substantially equal to the behavior of the upstream side A/F, and the reaction speed VOSA≈1, and the oxygen storage amount OSA≈0 are satisfied. Namely, when the oxygen storage amount OSA and the reaction speed VOSA that are calculated are extremely smaller than the oxygen storage amount OSA at the normal time and the reaction speed VOSA at the normal time, the three-way catalyst can be identified as being dissolved and lost. More specifically, when the OSA deviation is a third predetermined amount (>the first predetermined amount) or more, and the VOSA deviation is a fourth predetermined amount (>the second predetermined amount) or more, the degradation state is identified as dissolved loss.

Figure 15:
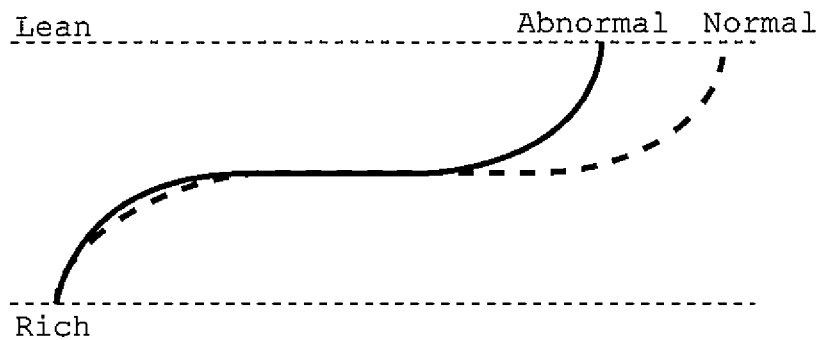
FIG. 15 is a diagram showing a behavior of the downstream side A/F at a time of clogging.

(iii) Clogging by Mn or the like refers to a phenomenon in which Mn or the like contained in fuel adheres to the three-way catalyst. In the case of clogging, adhering Mn inhibits the oxygen adsorbing and emitting action of the metal cerium. FIG. 15 is a diagram showing a behavior of the downstream side A/F at a time of clogging. As shown in FIG. 15, the behavior of the downstream side NF at the time of clogging is substantially the same as the behavior of the downstream side NF at the normal time. However, the calculated reaction speed VOSA becomes slightly higher as compared with the reaction speed VOSA at the normal time, and the calculated oxygen storage amount OSA becomes smaller as compared with calculated oxygen storage amount OSA at the normal time. Namely, in the case in which the calculated oxygen storage amount OSA is smaller than the oxygen storage amount OSA at the normal time, when the calculated reaction speed VOSA is substantially the same as or slightly smaller than the reaction speed VOSA at the normal time, the degradation state can be identified as clogging. More specifically, when the OSA deviation is the first predetermined amount or more, and the VOSA deviation is a fifth predetermined amount (<the second predetermined amount) or less, the degradation state is identified as clogging.

Figure 16:
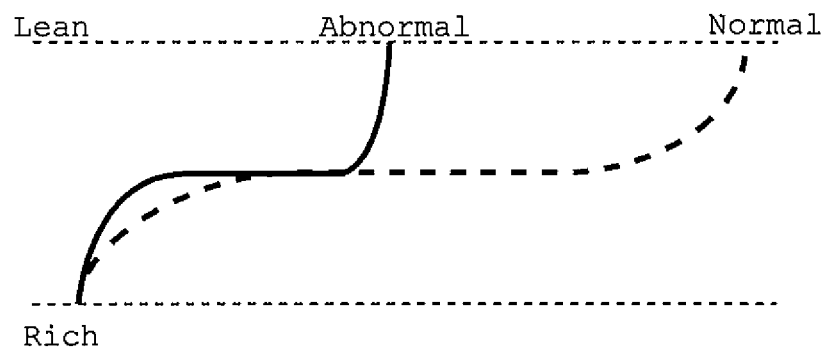
FIG. 16 is a diagram showing a behavior of the downstream side A/F at the time of poisoning degradation.

(iv) Poisoning degradation refers to a phenomenon in which sulfur (S) or the like contained in fuel and engine oil temporarily adheres to the three-way catalyst. In the case of poisoning degradation, adhering S temporarily inhibits progress of the exhaust emission purifying reaction in the precious metal catalyst, and the oxygen storage and emission action of the metal cerium. FIG. 16 is a diagram showing a behavior of the downstream side A/F at the time of poisoning degradation. As shown in FIG. 16, the behavior of the downstream side A/F at the time of poisoning degradation shows a behavior similar to the behavior of the downstream side A/F at the time of thermal degradation. However, unlike thermal degradation, the catalyst is restored from poisoning degradation if the operation conditions are changed. Therefore, if the oxygen storage amount OSA and the reaction speed VOSA change by predetermined values or more and reach the values at the normal time after operation under predetermined restoration conditions from poisoning, such as a high-temperature operation condition in which the bed temperature of the S/C 14 becomes 700° C. or more, and a rich control operation condition after an F/C operation, the degradation state can be identified as poisoning degradation. More specifically, when in the case in which the OSA deviation is the first predetermined amount or more, and the VOSA deviation is the second predetermined amount or more, an operation is performed under the predetermined restoration conditions from poisoning, and thereafter, the OSA deviation becomes less than the first predetermined amount, and the VOSA deviation becomes less than the second predetermined amount, the degradation state is identified as poisoning degradation.

Figure 17:
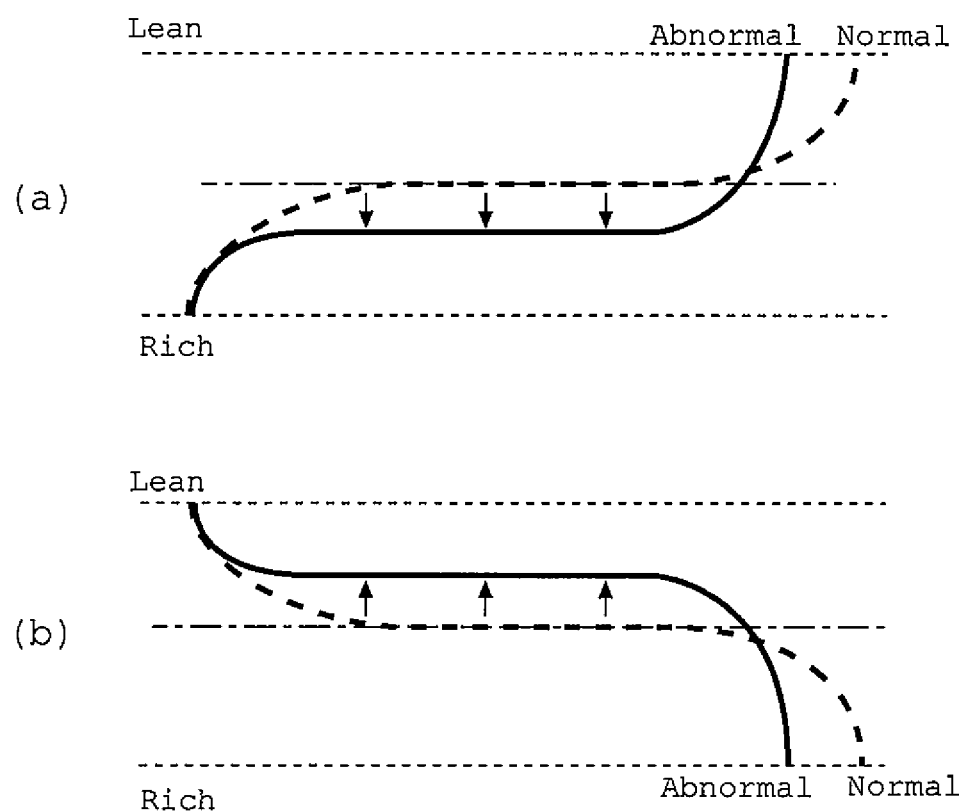
FIG. 17 is a diagram showing a behavior of the downstream side A/F at the time of lateral cracking of a matrix.

(v) Matrix cracking includes two kinds of cracking that are vertical cracking in which a cracking direction is orthogonal to a gas flow direction, and lateral cracking parallel with the gas flow direction. In the case of the vertical cracking, the oxygen storage amount OSA and the reaction speed VOSA are hardly influenced. In the case of the lateral cracking, in the catalyst except for fragmented spots, the catalyst functions in the same manner as at the normal time, but in the fragmented spots, inflow gas leaks out. FIG. 17 is a diagram showing a behavior of the downstream side A/F at the time of lateral cracking of a matrix. As shown in FIG. 17(*a*) (or FIG. 17(*b*)), as for the downstream side A/F at the time of lateral cracking of the matrix, a gas equilibration point shifts to a rich side (or a lean side) due to the influence of the gas that leaks out from the fragmented spots. Namely, when the calculated oxygen storage amount OSA and the calculated reaction speed VOSA are substantially the same as the oxygen storage amount OSA at the normal time and the reaction speed VOSA at the normal time, and the gas equilibrium point shifts to a rich side (or lean side), the degradation state is identified as clogging.

Note that the above described respective first predetermined amount to fifth predetermined amount are set in advance, and thereafter, are stored inside the ECU 20.

[Concrete Processing in Embodiment 3]

Figure 18:
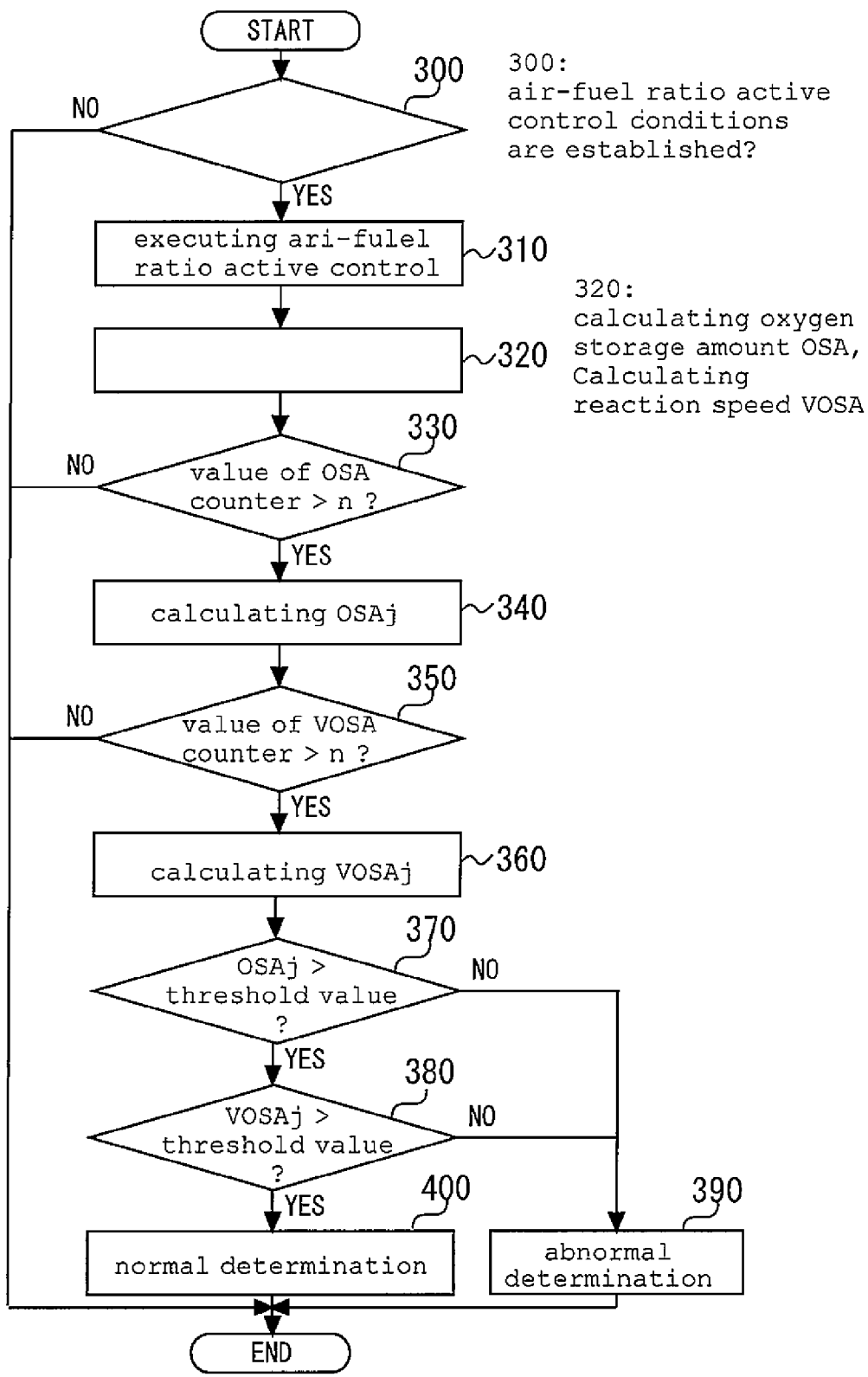
FIG. 18 is a flowchart showing a catalyst degradation detection routine that is executed by the ECU 20 in the third embodiment.

Next, with reference to FIG. 18, concrete processing for realizing the aforementioned function will be described. FIG. 18 is a flowchart showing a catalyst degradation detection routine that is executed by the ECU 20 in the present embodiment. Note that the routine shown in FIG. 18 is executed by being repeated regularly.

In the routine shown in FIG. 18, the ECU 20 initially executes processing of steps 300 and 310. The processing of steps 300 and 310 is the same as the processing of steps 100 and 110 of FIG. 5. After step 310, the ECU 20 calculates the oxygen storage amount OSA and the reaction speed VOSA (step 320). Here, the oxygen storage amount OSA is calculated from the subroutine shown in FIG. 6, and the reaction speed VOSA is calculated from the subroutine shown in FIG. 12, respectively.

In step 330, the ECU 20 determines whether or not the value of the OSA counter is n or more. Processing of the present step is the same as the processing of step 130 of FIG. 5, and when it is determined that the value of the OSA counter is n or more, the ECU 20 proceeds to step 340. Meanwhile, when the value of the OSA counter is less than n, the ECU 20 ends the present routine to calculate the oxygen storage amount OSA again.

In step 340, the ECU 20 calculates the average value OSAj of the oxygen storage amount OSA. Processing of the present step is the same as the processing of step 140 of FIG. 5.

After step 340, the ECU 20 determines whether or not the value of the VOSA counter is n or more (step 350). Processing of the present step is the same as the processing of step 230 of FIG. 11, and when it is determined that the value of the VOSA counter is n or more, the ECU 20 proceeds to step 360. Meanwhile, when it is determined the value of the VOSA counter is smaller than n, the ECU 20 ends the present routine to calculate the reaction speed VOSA again.

In step 360, the ECU 20 calculates the average value VOSAj of the reaction speed VOSA. Processing of the present step is the same as the processing of step 240 of FIG. 11.

After step 360, the ECU 20 determines whether or not the average value OSAj of the oxygen storage amount OSA is larger than a threshold value (step 370). When it is determined that the average value OSAj is larger than the threshold value in step 370, the ECU 20 proceeds to step 380. Meanwhile, when it is determined that the average value OSAj is the threshold value or less in step 370, the ECU 20 proceeds to step 390. Note that the threshold value that is used in step 370 is the value that is the same as the threshold value that is used in step 150 of FIG. 5, and the value that is set in advance and stored in the ECU 20 is used.

In step 380, the ECU 20 determines whether or not the average value VOSAj of the reaction speed VOSA is larger than the threshold value. When it is determined that the average value VOSAj is larger than the threshold value, the ECU 20 proceeds to step 400, and determines that the oxidation-reduction capacity of the three-way catalyst is normal. Meanwhile, when it is determined that the average value VOSAj is the threshold value or less, the ECU 20 proceeds to step 390. Note that the threshold value that is used in step 380 is the same value as the threshold value that is used in step 250 of FIG. 12, and the value that is set in advance and stored in the ECU 20 is used.

In step 390, the ECU 20 identifies the degradation state of the three-way catalyst. Note that the method for identifying the degradation state is as already described.

As above, according to the routine shown in FIG. 18, the average value OSAj of the oxygen storage amount OSA and the average value VOSAj of the reaction speed VOSA are simultaneously obtained, and therefore, the degradation of the three-way catalyst can be detected with higher precision. Further, when it is determined that the average value OSAj of the oxygen storage amount OSA is the threshold value or less, and when it is determined that the average value VOSAj of the reaction speed VOSA is the threshold value or less, the cause of the degradation of the three-way catalyst can be identified.

Note that in the above described embodiment 3, the ECU 20 executes the processing of step 390 of FIG. 18, whereby the "degradation state identifying means" in the above described third invention is realized.

Embodiment 4

Next, with reference to FIGS. 19 and 20, embodiment 4 of the present invention will be described. In the present embodiment, it is a feature thereof to execute rich-specific air-fuel ratio active control routine shown in FIG. 20 in the device configuration of FIG. 1. Therefore, explanation of the device configuration will be omitted.

In the above described embodiments 1 to 3, the air-fuel ratio active control is executed at the time of calculation of the oxygen storage amount OSA and the reaction speed VOSA. However, since during execution of the air-fuel ratio active control, the target air-fuel ratio is switched in a short period of time, emission is easily worsened, and especially at the lean side, unpurified NOx is discharged to the downstream side of the SIC 14. Thus, in the present embodiment, control of switching the upstream side A/F to rich (hereinafter, called "rich-specific air-fuel ratio active control") is executed at a point of time when the downstream side A/F changes from stoichiometry to lean.

[Air-Fuel Ratio Behavior During Rich-Specific Air-Fuel Ratio Active Control]

Figure 19:
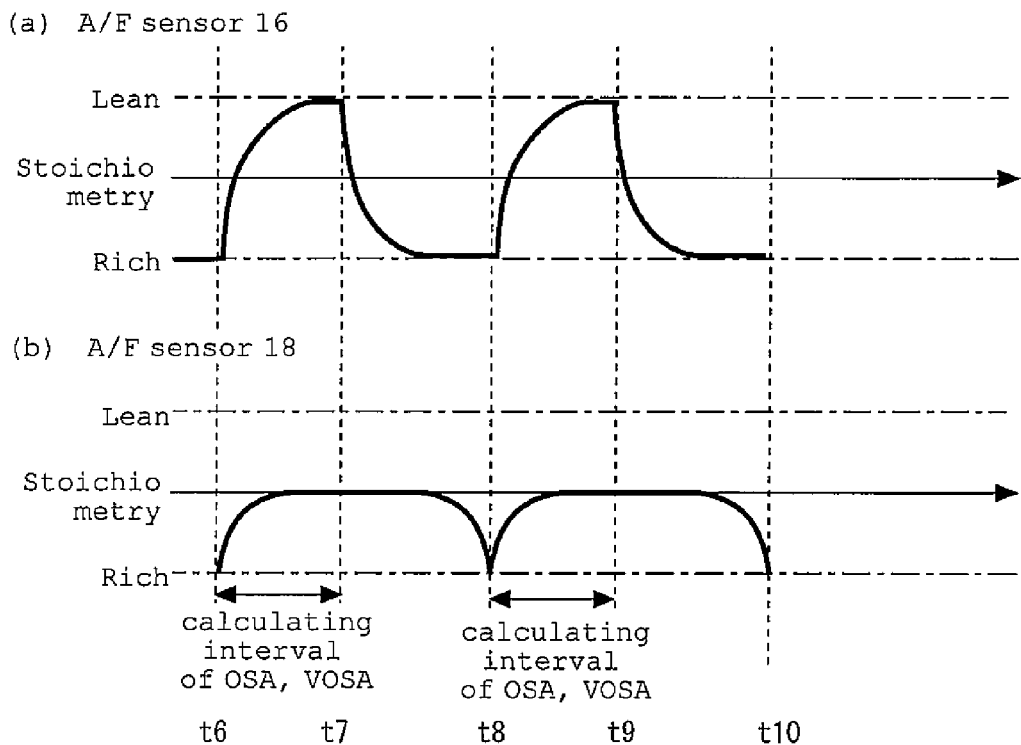
FIG. 19 is a diagram showing an air-fuel ratio behavior during rich-specific air-fuel ratio active control.

FIG. 19 is a diagram showing an air-fuel ratio behavior during rich-specific air-fuel ratio active control. In the rich-specific air-fuel ratio active control, a target air-fuel ratio is initially set so that the upstream side A/F changes from rich to lean. Therefore, in a time period from a time $t_6$ to a time $t_7$, the upstream side A/F changes from a predetermined value at the rich side toward a predetermined value at the lean side (FIG. 19(a)). Meanwhile, the downstream side A/F changes from a predetermined value at the rich side toward stoichiometry in the same time period (FIG. 19(b)).

In the rich-specific air-fuel ratio active control, a changing direction of the target air-fuel ratio is switched at a point of time when the downstream side A/F changes from stoichiometry to lean. Therefore, at the time $t_7$, the target air-fuel ratio is switched from lean to rich. Thereby, in a time period from the time $t_7$ to a time $t_8$, the upstream side A/F changes from the predetermined value at the lean side to the predetermined value at the rich side. Meanwhile, the downstream side A/F changes from stoichiometry to the predetermined value at the rich side in the same period of time. When the downstream side A/F reaches the predetermined value at the rich side at the time $t_8$, the target air-fuel ratio is switched from rich to lean. An air-fuel ratio behavior from the time $t_8$ forward is repetition of the above description. Namely, the downstream side A/F changes from the predetermined value to stoichiometry in a time period from the time $t_8$ to a time $t_9$, and when the target air-fuel ratio is switched from lean to rich at the time $t_9$, the downstream side A/F changes from stoichiometry toward the predetermined value at the rich side in a time period from the time $t_9$ to a time $t_{10}$.

If the rich-specific air-fuel ratio active control is executed, NOx discharge at the lean side can be suppressed. Accordingly, worsening of the exhaust emission can be prevented. Further, the storage cycle side is stopped with the minimum oxygen amount, and is switched to the emission cycle side, and after oxygen is sufficiently emitted, the emission cycle side is switched to the storage cycle side again. Therefore, stable measurement of the oxygen storage amount OSA and the reaction speed VOSA is enabled. Further, by including the emission cycle, the influence of S poisoning can be also reduced. Furthermore, the rich-specific air-fuel ratio active control does not include an air-fuel ratio change in the lean region, and can reduce the control execution time period correspondingly as compared with the air-fuel ratio active control, and therefore, worsening of emission following switching of the target air-fuel ratio also can be kept at a minimum.

[Concrete Processing in Embodiment 4]

Next, with reference to FIG. 20, concrete processing for realizing the aforementioned function will be described. FIG. 20 is a flowchart showing the rich-specific air-fuel ratio active control routine that is executed by the ECU 20 in the present embodiment. Note that the routine shown in FIG. 20 is executed in place of execution of the air-fuel ratio active control (for example, step 110 of FIG. 5). Further, the routine shown in FIG. 20 is repeatedly executed for a predetermined time period.

Figure 20:
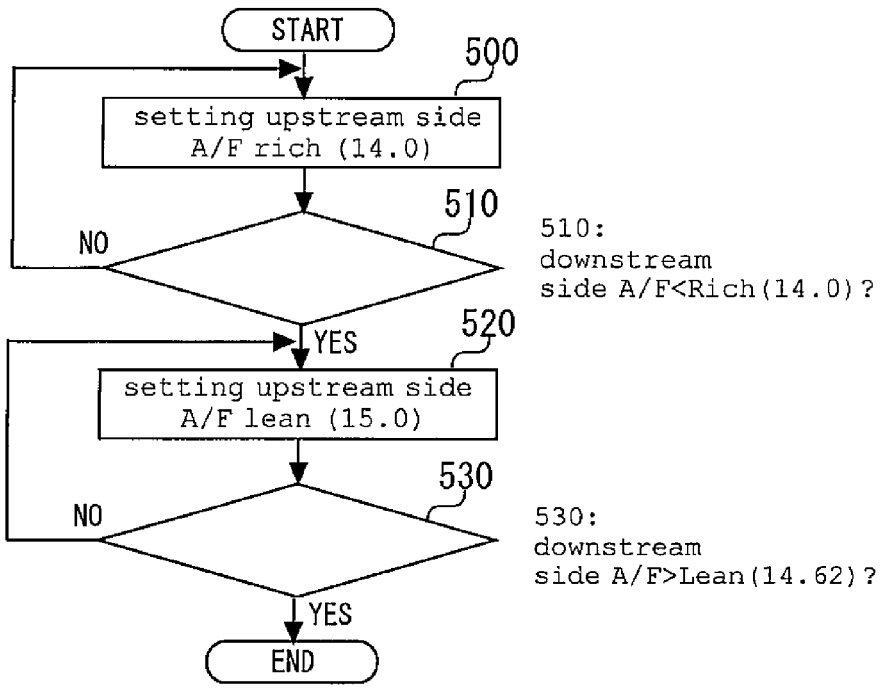
FIG. 20 is a flowchart showing the rich-specific air-fuel ratio active control routine that is executed by the ECU 20 in the fourth embodiment.

In the routine shown in FIG. 20, the ECU 20 initially sets a target air-fuel ratio so that the upstream side A/F becomes rich (14.0), and performs feedback control on the basis of the output value of the A/F sensor 16 (step 500). Subsequently, the ECU 20 determines whether or not the downstream side A/F reaches rich (14.0) (step 510). The processing of the present step is repeatedly executed until the downstream side A/F reaches rich.

When it is determined that the downstream side A/F reaches rich in step 510, the ECU 20 sets the target air-fuel ratio so that the upstream side A/F becomes lean (15.0), and performs feedback control on the basis of the output value of the A/F sensor 16 (step 520). Subsequently, the ECU 20 determines whether or not the downstream side A/F reaches lean (14.62) (step 530). The processing of the present step is repeatedly executed until the downstream side A/F reaches lean. When it is determined that the downstream side A/F reaches lean in step 530, the ECU 20 ends the present routine.

As above, according to the routine shown in FIG. 20, when it is determined that the downstream side A/F reaches lean, the target air-fuel ratio is set at rich. Therefore, the time period in which the downstream side A/F reaches the lean region can be reduced, and worsening of the emission following switching of the target air-fuel ratio also can be kept at a minimum while NOx discharge at the lean side is suppressed. Further, when it is determined that the downstream side A/F reaches rich, the target air-fuel ratio is set at lean, and therefore, after the emission cycle is performed and oxygen is sufficiently emitted from the three-way catalyst, the emission cycle can be switched to the storage cycle side. Accordingly, stable measurement of the oxygen storage amount OSA and the reaction speed VOSA is enabled. Further, by passing the catalyst through the emission cycle, the influence of S poisoning can be reduced.

DESCRIPTION OF REFERENCE NUMERALS 10 engine
12 exhaust passage
14 S/C
16, 18 A/F sensor
20 ECU
22 three-way catalyst
24 DPF

The invention claimed is:

1. A catalyst-degradation detection device, comprising:
a three-way catalyst that is disposed in an exhaust passage of an internal combustion engine to purify exhaust emission;
an air-fuel ratio active control means that executes air-fuel ratio active control that forcefully and periodically switches a target air-fuel ratio at an upstream side from the three-way catalyst to a richer side and a leaner side than stoichiometry;
a downstream side air-fuel ratio sensor that detects an exhaust air-fuel ratio at a downstream side from the three-way catalyst; and
an oxygen storage capacity degradation determining means that determines degradation relating to an oxygen storage capacity of the three-way catalyst by using the exhaust air-fuel ratio detected by the downstream side air-fuel ratio sensor during execution of the air-fuel ratio active control,
an upstream side air-fuel ratio sensor that detects an exhaust air-fuel ratio at an upstream side from the three-way catalyst; and
an exhaust emission purification capacity determining means that determines degradation relating to an exhaust emission purification capacity of the three-way catalyst by using the exhaust air-fuel ratios that are detected by the upstream side air-fuel ratio sensor and the downstream side air-fuel ratio sensor during execution of the air-fuel ratio active control, wherein
the oxygen storage capacity degradation determining means determines degradation relating to the oxygen storage capacity of the three-way catalyst by using an oxygen storage amount that is calculated by using an exhaust air-fuel ratio detected by the downstream side air-fuel ratio sensor in a storage time period from a predetermined starting point in a rich region until a predetermined end point after reaching stoichiometry and before shifting to a lean region at a time of switching the target air-fuel ratio from rich to lean, or an oxygen emission amount that is calculated by using an exhaust air-fuel ratio detected by the downstream side air-fuel ratio sensor in an emission time period from a predetermined starting point in the lean region until a predetermined end point after reaching stoichiometry and before shifting to the rich region at a time of switching the target air-fuel ratio from lean to rich, and
the exhaust emission purification capacity determining means determines degradation relating to the exhaust emission purification capacity of the three-way catalyst by using an oxygen storage change speed that is calculated by using the exhaust air-fuel ratios that are detected by the upstream side air-fuel ratio sensor and the downstream side air-fuel ratio sensor in the storage time period, or an oxygen emission change speed that is calculated by using the exhaust air-fuel ratio detected by the upstream side air-fuel ratio sensor and the downstream side air-fuel ratio sensor in the emission time period.

2. The catalyst-degradation detection device according to claim 1, further comprising:
a degradation state identifying means that identifies a degradation state of the three-way catalyst by using at least one of a first index obtained from the oxygen storage amount or the oxygen emission amount, and a second index obtained from the oxygen storage change speed or the oxygen emission change speed.

3. The catalyst-degradation detection device according to claim 2,
wherein the degradation state identifying means identifies the three-way catalyst as being in a thermal degradation state when a deviation between an initial storage/emission amount set as an oxygen storage amount or an oxygen emission amount that is calculated in an initial state of the three-way catalyst, and the first index is a first predetermined amount or more, or when a deviation between an initial change speed set as an oxygen storage change speed or an oxygen emission change speed that is calculated in the initial state of the three-way catalyst, and the second index is a second predetermined amount or more.

4. The catalyst-degradation detection device according to claim 2,
wherein the degradation state identifying means identifies the three-way catalyst as being in a dissolved loss state when in a case in which the deviation between the initial storage/emission amount and the first index is the first predetermined amount or more, and the deviation between the initial change speed and the second index is the second predetermined amount or more the deviation between the initial storage/emission amount and the first index is a third predetermined amount that is larger than the first predetermined amount or more, and the deviation between the initial change speed and the second index is a fourth predetermined amount that is larger than the second predetermined amount or more.

5. The catalyst-degradation detection device according to claim 3,
wherein the degradation state identifying means identifies the three-way catalyst as being in a clogged state when in a case in which the deviation between the initial storage/emission amount and the first index is the first predetermined amount or more, and the deviation between the initial change speed and the second index is less than the second predetermined amount the deviation between the initial storage/emission amount and the first index is the first predetermined amount or more, and the deviation between the initial change speed and the second index is a fifth predetermined amount that is smaller than the second predetermined amount or less.

6. The catalyst-degradation detection device according to claim 3,
wherein the degradation state identifying means identifies the three-way catalyst as being in a temporarily poisoned state when in a case in which the deviation between the initial storage/emission amount and the first index is the first predetermined amount or more, and the deviation between the initial change speed and the second index is the second predetermined amount or more, an operation is performed under a predetermined restoration condition from poisoning, and thereafter, the deviation between the initial storage/emission amount and the first index becomes less than the first predetermined amount, and the deviation between the initial change speed and the second index becomes less than the second predetermined amount.

7. The catalyst-degradation detection device according to claim 2,
wherein the degradation state identifying means identifies the three-way catalyst as being in a matrix cracking state when in a case in which the first index is substantially the same as an oxygen storage amount that is calculated in an initial state of the three-way catalyst and also the second index is substantially the same as an oxygen storage change speed that is calculated in the initial state of the three-way catalyst, and a gas equilibration point of the exhaust air-fuel ratio detected by the downstream side air-fuel ratio sensor in the storage time period shifts to a richer side than stoichiometry, or when in a case in which the first index is substantially the same as an oxygen emission amount storage that is calculated in an initial state of the three-way catalyst and also the second index is substantially the same as an oxygen emission change speed that is calculated in the initial state of the three-way catalyst, and a gas equilibration point of the exhaust air-fuel ratio detected by the downstream side air-fuel ratio sensor in the emission time period shifts to a leaner side than stoichiometry.

8. The catalyst-degradation detection device according to claim 1,
wherein the oxygen storage capacity degradation determining means determines the degradation relating to the oxygen storage capacity of the three-way catalyst by using the oxygen storage amount.

9. The catalyst-degradation detection device according to claim 1,
wherein the exhaust emission purification capacity determining means determines the degradation relating to the exhaust emission purification capacity of the three-way catalyst by using the oxygen storage change speed.

10. The catalyst-degradation detection device according to claim 1,
wherein the air-fuel ratio active control means executes rich-specific air-fuel ratio active control that forcefully and periodically switches the target air-fuel ratio to a richer side and a leaner side than stoichiometry by switching the target air-fuel ratio from lean to rich, immediately after the storage time period elapses.

11. A catalyst-degradation detection device, comprising:
a three-way catalyst that is disposed in an exhaust passage of an internal combustion engine to purify exhaust emission;
a downstream side air-fuel ratio sensor that detects an exhaust air-fuel ratio at a downstream side from the three-way catalyst;
an upstream side air-fuel ratio sensor that detects an exhaust air-fuel ratio at an upstream side from the three-way catalyst; and
a control unit which is configured to execute air-fuel ratio active control that forcefully and periodically switches a target air-fuel ratio at an upstream side from the three-way catalyst to a richer side and a leaner side than stoichiometry, determine degradation relating to an oxygen storage capacity of the three-way catalyst by using the exhaust air-fuel ratio detected by the downstream side air-fuel ratio sensor during execution of the air-fuel ratio active control, and determine degradation relating to an exhaust emission purification capacity of the three-way catalyst by using the exhaust air-fuel ratios that are detected by the upstream side air-fuel ratio sensor and the downstream side air-fuel ratio sensor during execution of the air-fuel ratio active control, wherein
the control unit determines the degradation relating to the oxygen storage capacity of the three-way catalyst by using an oxygen storage amount that is calculated by using an exhaust air-fuel ratio detected by the downstream side air-fuel ratio sensor in a storage time period from a predetermined starting point in a rich region until a predetermined end point after reaching stoichiometry and before shifting to a lean region at a time of switching the target air-fuel ratio from rich to lean, or an oxygen emission amount that is calculated by using an exhaust air-fuel ratio detected by the downstream side air-fuel ratio sensor in an emission time period from a predetermined starting point in the lean region until a predetermined end point after reaching stoichiometry and before shifting to the rich region at a time of switching the target air-fuel ratio from lean to rich, and
the control unit determines the degradation relating to the exhaust emission purification capacity of the three-way catalyst by using an oxygen storage change speed that is calculated by using the exhaust air-fuel ratios that are detected by the upstream side air-fuel ratio sensor and the downstream side air-fuel ratio sensor in the storage time period, or an oxygen emission change speed that is calculated by using the exhaust air-fuel ratio detected by the upstream side air-fuel ratio sensor and the downstream side air-fuel ratio sensor in the emission time period.

12. The catalyst-degradation detection device according to claim 11,
wherein the control unit identifies a degradation state of the three-way catalyst by using at least one of a first index obtained from the oxygen storage amount or the oxygen emission amount, and a second index obtained from the oxygen storage change speed or the oxygen emission change speed.

13. The catalyst-degradation detection device according to claim 11,
wherein the control unit determines the degradation relating to the oxygen storage capacity of the three-way catalyst by using the oxygen storage amount.

14. The catalyst-degradation detection device according to claim 11,
wherein the control unit determines the degradation relating to the exhaust emission purification capacity of the three-way catalyst by using the oxygen storage change speed.

15. The catalyst-degradation detection device according to according to claim 11,
wherein the control unit executes rich-specific air-fuel ratio active control that forcefully and periodically switches the target air-fuel ratio to a richer side and a leaner side than stoichiometry by switching the target air-fuel ratio from lean to rich, immediately after the storage time period elapses.

* * * * *